(12) United States Patent
Donnelly

(10) Patent No.: US 10,532,749 B2
(45) Date of Patent: Jan. 14, 2020

(54) SYSTEMS AND METHODS TO ADJUST AUTONOMOUS VEHICLE PARAMETERS IN RESPONSE TO PASSENGER FEEDBACK

(71) Applicant: UATC, LLC, San Francisco, CA (US)

(72) Inventor: Richard Brian Donnelly, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 73 days.

(21) Appl. No.: 15/810,296

(22) Filed: Nov. 13, 2017

(65) Prior Publication Data

US 2019/0047584 A1 Feb. 14, 2019

Related U.S. Application Data

(60) Provisional application No. 62/544,432, filed on Aug. 11, 2017.

(51) Int. Cl.
*B60W 50/10* (2012.01)
*B60W 50/08* (2012.01)
*G05D 1/00* (2006.01)
*G06F 3/0484* (2013.01)
*B60W 50/14* (2012.01)

(52) U.S. Cl.
CPC .......... *B60W 50/085* (2013.01); *B60W 50/10* (2013.01); *G05D 1/0088* (2013.01); *G06F 3/04842* (2013.01); *B60W 2050/146* (2013.01); *G05D 2201/0213* (2013.01)

(58) Field of Classification Search
CPC .... B60W 50/085; B60W 50/25; B60W 50/10; G05D 1/0088; G06F 3/04842
USPC ........................ 701/23, 29.1, 31.4, 31.5, 31.9
See application file for complete search history.

(56) References Cited

U.S. PATENT DOCUMENTS

| | | | |
|---|---|---|---|
| 2017/0090478 A1* | 3/2017 | Blayvas | G01C 21/3453 |
| 2017/0096164 A1* | 4/2017 | Sun | B62D 1/28 |
| 2017/0212515 A1* | 7/2017 | Bertollini | B60Q 9/00 |
| 2017/0372431 A1* | 12/2017 | Perl | G06Q 20/10 |
| 2018/0101170 A1* | 4/2018 | Cawley | G05D 1/0088 |
| 2018/0178794 A1* | 6/2018 | Schwindt | B60W 30/162 |
| 2018/0265076 A1* | 9/2018 | Hall | B60W 30/02 |
| 2018/0276485 A1* | 9/2018 | Heck | G06N 7/005 |

(Continued)

*Primary Examiner* — Thomas G Black
*Assistant Examiner* — Wae L Louie
(74) *Attorney, Agent, or Firm* — Dority & Manning, PA

(57) ABSTRACT

Systems and methods for adjusting autonomous vehicle parameters in response to passenger feedback are provided. A method can include obtaining, by a computing system comprising one or more computing devices, passenger input data descriptive of one or more passenger experiences associated with one or more autonomous driving sessions, obtaining, by the computing system, one or more vehicle data logs descriptive of vehicle conditions associated with the passenger input data descriptive of one or more passenger experiences associated with the one or more autonomous driving sessions, determining, by the computing system using a machine-learned model, an adjusted vehicle parameter of an autonomous vehicle based at least in part on the passenger input data descriptive of one or more passenger experiences and the associated one or more vehicle data logs descriptive of vehicle conditions, and implementing, by the computing system, the adjusted vehicle parameter in an operation of the autonomous vehicle.

20 Claims, 7 Drawing Sheets

(56) References Cited

U.S. PATENT DOCUMENTS

2018/0276912 A1* 9/2018 Zhou .................... G07C 5/0808
2018/0302484 A1* 10/2018 Kothari .................. H04W 4/40
2018/0335776 A1* 11/2018 Theis ................... G05D 1/0088
2019/0111933 A1* 4/2019 Schoeggl .......... B60W 50/0097
2019/0113362 A1* 4/2019 Kline ................. G01C 21/3682

* cited by examiner

SYSTEMS AND METHODS TO ADJUST AUTONOMOUS VEHICLE PARAMETERS IN RESPONSE TO PASSENGER FEEDBACK

PRIORITY CLAIM

The present application is based on and claims priority to U.S. Provisional Application 62/544,432 having a filing date of Aug. 11, 2017, which is incorporated by reference herein.

FIELD

The present disclosure relates generally to autonomous vehicles. More particularly, the present disclosure relates to systems and methods to adjust autonomous vehicle operating parameters in response to passenger feedback.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to adjust a vehicle parameter for an autonomous vehicle. The method can include obtaining, by a computing system comprising one or more computing devices, passenger input data descriptive of one or more passenger experiences associated with one or more autonomous driving sessions. The method can further include obtaining, by the computing system, one or more vehicle data logs descriptive of vehicle conditions associated with the passenger input data descriptive of one or more passenger experiences associated with the one or more autonomous driving sessions. The method can further include determining, by the computing system using a machine-learned model, an adjusted vehicle parameter of an autonomous vehicle based at least in part on the passenger input data descriptive of one or more passenger experiences and the associated one or more vehicle data logs descriptive of vehicle conditions. The method can further include implementing, by the computing system, the adjusted vehicle parameter in an operation of the autonomous vehicle.

Another example aspect of the present disclosure is directed to a computing system. The computing system can include one or more processors and one or more non-transitory computer-readable media that collectively store at least one set of passenger input data descriptive of one or more passenger experiences associated with one or more autonomous driving sessions comprising data indicative of a positive or negative experience for one or more of a pick-up event, a drop-off event, or an in-ride event and at least one vehicle data log descriptive of vehicle conditions associated with the passenger input data descriptive of one or more passenger experiences, the at least one vehicle data log comprising one or more operating parameters of an autonomous vehicle performing a vehicle action associated with the passenger input data indicative of one or more passenger experiences or data indicative of one or more conditions associated with an environment of the autonomous vehicle while the autonomous vehicle performed the vehicle action. The non-transitory computer-readable media can further store instructions that, when executed by the one or more processors, cause the computing system to associate the at least one set of passenger input data descriptive of one or more passenger experiences and the at least one associated vehicle data log with at least one identified operating parameter or identified condition associated with the environment of the autonomous vehicle and train a machine-learned model to perform a vehicle parameter adjustment based at least in part on the at least one identified operating parameter or identified condition associated with the environment of the autonomous vehicle.

Another example aspect of the present disclosure is directed to one or more non-transitory computer-readable media that collectively store instructions that, when executed by one or more processors, cause a computing system to perform operations. The operations can include obtaining passenger input data descriptive of one or more passenger experiences. The passenger input data can include data indicative of a positive or negative experience for one or more of a pick-up event, a drop-off event, or an in-ride event associated with one or more autonomous driving sessions. The operations can further include obtaining one or more vehicle data logs descriptive of vehicle conditions associated with the passenger input data descriptive of one or more passenger experiences. The one or more vehicle data logs can include one or more operating parameters of an autonomous vehicle performing a vehicle action associated with the passenger input data indicative of one or more passenger experiences and data indicative of one or more conditions associated with an environment of the autonomous vehicle while the autonomous vehicle performed the vehicle action. The operations can further include inputting the passenger input data descriptive of one or more passenger experiences and the associated one or more vehicle data logs descriptive of vehicle conditions into a machine-learned model. The operations can further include receiving data indicative of an adjusted vehicle parameter as an output of the machine-learned model. The operations can further include implementing the adjusted vehicle parameter in the operation of an autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
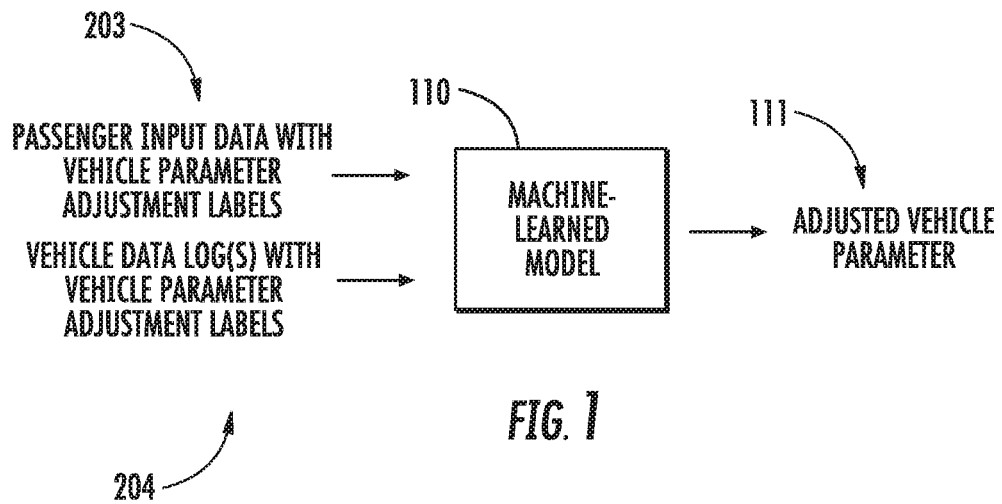
FIG. 1 depicts a block diagram of an example training configuration according to example aspects of the present disclosure.

Generally, the present disclosure is directed to systems and methods for adjusting a vehicle parameter in response to one or more passenger experiences in autonomous vehicle driving sessions. In particular, the systems and methods of the present disclosure can include or otherwise leverage one or more machine-learned models that can associate passenger input data (also referred to as passenger feedback) to one or more autonomous vehicle operating parameters or conditions associated with the environment of an autonomous vehicle in order to adjust a vehicle parameter to improve passenger experiences. As one example, a passenger can input data into a human machine interface device indicating whether a pick-up, in-ride, or drop-off event was a positive or negative experience. A machine-learned model can obtain the passenger input data indicative of a passenger experience and associated vehicle condition data indicative of one or more vehicle operating parameters (e.g., a vehicle stop duration) and/or conditions associated with an environment of a vehicle (e.g., a traffic condition) and determine an adjusted vehicle parameter based on the passenger input data and vehicle data. For example, the adjusted vehicle parameter can adjust a vehicle cost function associated with planning a motion of the autonomous vehicle. For example, a passenger can input that a pick-up experience was negative due to the pick-up taking too long by impeding the flow of vehicle traffic and causing an embarrassing situation. The machine-learned model can obtain the passenger input data and associated vehicle condition data, and adjust a vehicle parameter, such as a cost function associated with a stop duration, to adjust the vehicle stop duration on future stops in similar conditions, thereby improving passenger experiences for future autonomous driving sessions.

More particularly, one aspect of developing, operating, and refining autonomous vehicle technology is continuously testing and evaluating the performance of autonomous vehicles to improve passenger experiences. As an example, during an autonomous vehicle driving session, the autonomous vehicle may encounter a situation in which the autonomous vehicle does not have specific preprogrammed logic to navigate the situation or in which the autonomous vehicle navigates the situation in a manner that frustrates a passenger. For example, an autonomous vehicle may hesitate to drive around an unknown object in a roadway, whereas a human may recognize the object poses no threat and therefore would immediately navigate around the object. Similarly, an autonomous vehicle may stop in-lane to pick up a passenger, thereby disrupting the flow of vehicular traffic, whereas a human may proceed until a suitable curbside parking spot is available in order to prevent disrupting the flow of vehicular traffic.

Incorporating how humans prefer to navigate such situations can assist in developing more human-like computational abilities in autonomous vehicles, thereby allowing for improved passenger experiences. For example, a human driver picking up a passenger, such as a cab driver responding to a pick-up request, may perform a plurality of actions in a near simultaneous manner in order to decide how to pick up the passenger. For example, the human driver may visually scan the area around a pick up location to identify possible passengers from nearby pedestrians, identify which of the nearby pedestrians is likely the passenger, estimate the readiness of the passenger, estimate a time for the passenger to get in the vehicle, observe traffic patterns, search for a parking spot, and make a split-second decision about whether to stop in-lane, park curb-side, or continue driving until a passenger pick-up can be executed more easily based on all of this information. An autonomous vehicle, however, may initially only have a few specific criteria that are used to make such a decision, such as, for example, a predetermined in-lane stop duration for a particular geographic location.

One potential technique to address such situations is to have a human manually determine or identify specific vehicle parameters to be adjusted to account for specific situations, and manually program the vehicle parameter adjustments for each situation. For example, a human programmer can review vehicle data logs, such as vehicle data logs associated with one or more autonomous vehicle driving sessions, identify situations in which a vehicle parameter should be adjusted, and manually program a vehicle parameter adjustment to account for the situation. For example, a human programmer can determine that an autonomous vehicle stopped in lane to pick up a passenger for 10 seconds, when a 5 second stop would have been preferable. The human programmer can manually adjust the vehicle parameter to change the way the autonomous vehicle responds to such situations in the future.

However, the above technique that relies upon human programmers to adjust vehicle parameters for specific situations has a number of drawbacks. As examples, the use of human programmers causes such technique to be high cost and challenging to scale. In addition, use of different human programmers can introduce a subjective element that may not reflect passenger preferences in the aggregate. Moreover, such an approach necessarily requires a specific number of variables and inputs into a decision-making algorithm, which may fail to account for some variables in various situations or become so computationally intensive that the decision-making process takes too long to be of use. Lastly, human programmers may not foresee or otherwise encounter every possible situation, and thus may not account for a particular situation an autonomous vehicle may encounter.

According to example aspects of the present disclosure, passenger input data and associated vehicle data logs can be input into a machine-learned model to determine an adjusted vehicle parameter, thereby allowing for improved passenger experiences. As an example, a passenger can provide input data descriptive of a passenger experience associated with one or more aspects of an autonomous vehicle driving session. For example, following a pick-up event, a passenger can provide input descriptive of the passenger's experience in a human machine interface device on-board the autonomous vehicle (e.g., tablet computer) or via a user computing device (e.g., the passenger's smartphone). For example, the passenger can be surveyed about their experience, such as whether it was a positive or negative experience, how positive or negative the experience was, and/or what factors caused the experience to be positive or negative. Similarly, following one or more in-ride events or after a drop-off event, passenger feedback can be obtained describing the passenger's experience.

Additionally, vehicle data logs descriptive of vehicle conditions associated with the passenger input data can also be obtained. For example, in some implementations, an autonomous vehicle computing system can include a perception system, a prediction system, a motion planning system, and/or other components or systems that cooperate to perceive the surrounding environment of the autonomous vehicle and determine a motion plan for controlling the motion of the autonomous vehicle accordingly. For example, the perception system can receive sensor data from one or more sensors (e.g., light detection and ranging sensors, radio detection and ranging sensors, cameras, etc.) that are coupled to or otherwise included within the autonomous vehicle. The perception system can identify one or more objects that are proximate to the autonomous vehicle based on the sensor data. The prediction system can receive object information from the perception system and can predict one or more future locations for each object based on the information received from the perception system. The motion planning system can determine a motion plan for the autonomous vehicle based at least in part on the predicted one or more future locations for the objects. Stated differently, given information about the current locations of objects and/or predicted future locations of proximate objects, the motion planning system can determine a motion plan for the autonomous vehicle that best navigates the autonomous vehicle relative to the objects at such locations. The autonomous vehicle can also include other systems and/or components including, for example, a localization system that determines a current location of the autonomous vehicle. The autonomous vehicle can further include various hardware and/or firmware components that perform various functions or implement various of the above described systems. Vehicle data logs descriptive of vehicle conditions associated with a passenger experience can be obtained, such as, for example, by logging vehicle data operating parameters and or data obtained from one of the vehicle systems (e.g., the perception system) for a relevant period of time associated with an event. For example, in some implementations, vehicle data can be logged beginning 20 seconds before a passenger pick-up event until 20 seconds after the pick-up event occurs.

According to example aspects of the present disclosure, passenger input data descriptive of one or more passenger experiences and one or more vehicle data logs descriptive of vehicle conditions associated with the passenger input data can be provided to a machine-learned model to determine an adjusted vehicle parameter of an autonomous vehicle. For example, the passenger input data and the vehicle data logs can be provided as an input to a machine-learned model, and data indicative of an adjusted vehicle parameter can be obtained as an output of the machine-learned model. In some implementations, the adjusted vehicle parameter can then be implemented in an autonomous vehicle.

According to another aspect of the present disclosure, previous passenger input data descriptive of passenger experiences and associated vehicle data logs that were previously collected during previous autonomous vehicle driving sessions can be used to train the machine-learned model. For example, the machine-learned model can be trained using training data that includes passenger input data and associated vehicle data logs with one or more vehicle parameters varied under various situations. In some implementations, the machine learned model can be trained to determine an adjusted vehicle parameter that improves a passenger experience, such as by using a ratio, count, score, or other comparison of positive vs. negative experiences, or a mean, median, standard deviation, or other metric of the quality of passenger experiences for a plurality of autonomous vehicle driving sessions. For example, the machine-learned model can be trained to determine an adjusted vehicle parameter by adjusting a vehicle parameter to improve or maximize a passenger experience.

In some implementations, the machine-learned model can be trained using training data that includes labels annotating previously adjusted vehicle parameters and/or adjustment amounts associated with the passenger input data and associated vehicle data logs. For example, a human reviewer can review the passenger input data and associated vehicle data logs and can manually assign a vehicle parameter adjustment label for one or more events. The humanly-assigned vehicle parameter adjustment label can be attached to the data collected by the autonomous vehicle at the time of the event (e.g., pick-up, drop-off, or in-ride event). Thus, although generally inefficient for the reasons discussed above, use of a human reviewer to provide manual vehicle parameter adjustment labels can result in a corpus of vehicle data logs that include vehicle parameter adjustment labels that are associated with various passenger experiences and corresponding vehicle data logs. For example, for a negative pick-up event in which a passenger feedback noted that the pick-up event was too long, a human reviewer can annotate a vehicle data log with a label indicating a vehicle stop duration should be shortened.

In some implementations, the machine-learned model can first be trained using training data that includes labels annotated by a human reviewer, and subsequently be trained using passenger input data and associated vehicle data logs that have not been annotated. For example, a machine-learned model can first be trained to identify vehicle parameters to adjust under various operating scenarios, and be further refined using passenger input data and associated vehicle data logs to determine specific adjustment amounts that increase and/or maximize a passenger experience according to one or more metrics.

Once the classifier model has been trained, the systems and methods of the present disclosure can assist in determining an adjusted vehicle parameter of an autonomous vehicle based on passenger input data descriptive of one or more passenger experiences and associated vehicle data logs descriptive of vehicle conditions. In addition, the systems and methods of the present disclosure can provide more consistent and accurate results than human reviewers and, further, can be applied to both real world vehicle data and simulated vehicle data. As such, the systems and methods of the present disclosure can be applied in a number of scenarios, including, as examples: determining an adjusted vehicle parameter to improve a passenger experience associated with previous passenger input and vehicle data logs from previously performed autonomous driving sessions; determining an adjusted vehicle parameter to improve a passenger experience in real-time; determining an adjusted vehicle parameter to improve a passenger experience in simulated events; determining an adjusted vehicle parameter for a particular geographic location; and/or other scenarios which will be discussed in more detail below.

More particularly, the systems and methods of the present disclosure can obtain passenger input descriptive of one or more passenger experiences to be used in determining an adjusted vehicle parameter for an autonomous vehicle. In some implementations, the passenger input data can be obtained via a human machine interface device located on-board an autonomous vehicle. In some implementations, the human machine interface device can include a display device (e.g., a touch-sensitive display device) and/or other input/output components that provide an interactive user interface (e.g., through which the passenger can provide passenger feedback). For example, the display device can be a rear-seat display device that is accessible by a passenger that is located in a rear seat of the autonomous vehicle. During an autonomous vehicle driving session, passenger feedback can be obtained following an event, such as a pick-up event or an in-ride event, by, for example, prompting a passenger to provide feedback on the human machine interface device located onboard the autonomous vehicle.

In some implementations, in addition or alternatively to the human machine interface device, the systems and methods of the present disclosure can include or leverage a user computing device (e.g., smartphone) that is associated with the passenger to obtain passenger input data indicative of a passenger experience. For example, in some implementations, in addition or alternatively to the display of the user interface by the human machine interface device, the interactive user interface can be provided on or accessible via a display of the user computing device. For example, following a drop-off event, a passenger can be prompted to provide feedback via the passenger's smartphone.

In some implementations, the passenger input data can include whether a passenger experience was positive or negative. For example, in some implementations, passenger input can be obtained via a user interface which first prompts whether a particular experience was positive or negative. In some implementations, the feedback prompt can include additional granularity, such as a rating on a scale (e.g., 1-5), or using text descriptors (e.g., unacceptable, marginal, acceptable, good, excellent, etc.). In some implementations, the feedback prompt can request additional information. For example, in some implementations, upon receiving a negative feedback, a user can be prompted to provide input describing why the experience was negative. For example, following a negative experience with a pick-up event, a user can be provided with a predetermined list of issues to choose from, such as the autonomous vehicle waited too long, the autonomous vehicle didn't wait long enough, the passenger would have preferred an in-lane stop rather than a curbside stop or vice-versa, traffic was interrupted, the autonomous vehicle stopped too far away, or other issues. In some implementations, a user can be prompted to provide open-ended feedback. For example, a user can be prompted to provide verbal feedback describing the problem. In some implementations, the verbal feedback can be analyzed using voice recognition software, and further can be classified based on the feedback provided.

In some implementations, the passenger input data can be specific to a particular passenger event. As used herein, the term "event" refers to a discrete occurrence or action during an autonomous vehicle driving session. Example events can include picking-up a passenger, dropping off a passenger, a turn, an acceleration, a deceleration, a stop, other vehicle actions, interactions with external objects, or other scenarios. For example, passenger input data can include passenger feedback for one or more of a pick-up event, an in-ride event, or a drop-off event. For example, a pick-up event can include any autonomous vehicle actions or passenger experiences associated with being picked up by the autonomous vehicle. Similarly, a drop-off event can include any autonomous vehicle actions or passenger experiences associated with being dropped off by the autonomous vehicle. An in-ride event can include any particular vehicle action during the autonomous vehicle driving session between the pick-up event and drop-off event. For example, an in-ride event can include one or more of: a turn, an acceleration, a deceleration, a stop duration, an object encounter, a pedestrian encounter, a vehicle encounter, or other action or encounter. In some implementations, an event detector can be used to detect when passenger feedback should be obtained. In some implementations, a user can initiate providing passenger feedback by, for example, interacting with a human machine interface device located on-board the autonomous vehicle. For example, a passenger can select a feedback option on a user interface displayed on a tablet computer.

Additionally, vehicle data logs descriptive of vehicle conditions associated with a passenger experience can also be obtained. For example, the vehicle data can be descriptive of vehicle conditions associated with an autonomous vehicle during an autonomous driving session in which a passenger provided feedback as passenger input data. In some implementations, the vehicle data can include data collected by or otherwise received from various sensors included in the autonomous vehicle, such as one or more operating parameters of an autonomous vehicle performing a vehicle action. As examples, the vehicle data can include data descriptive of one or more of the following operating parameters: a speed (also referred to as velocity), a steering angle, an acceleration, a deceleration, a vehicle location, a vehicle stop duration, a proximity to a pick-up location, a proximity to a drop-off location, a passenger comfort setting, a braking amount, a vehicle class, operation of an adaptive cruise control system, or any other conditions or operating parameters associated with the autonomous vehicle.

Additionally, the vehicle data can include various other types of data descriptive of vehicle conditions, such as data indicative of one or more conditions associated with the environment of the autonomous vehicle. For example, vehicle data logs can include data indicative of vehicle traffic conditions, vehicle behaviors, pedestrian behaviors, or objects proximate to the autonomous vehicle. Such data can include, for example, light detection and ranging data; radio detection and ranging data; imagery collected by one or more cameras onboard the autonomous vehicle; weather condition data, accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle (e.g., collected or produced by sensors or systems onboard the vehicle). As indicated above, the systems and methods of the present disclosure can determine an adjusted vehicle parameter based on such vehicle data.

In some implementations of the present disclosure, the passenger input data and associated vehicle data can include passenger input data and associated vehicle data logs from completed driving sessions. For example, an autonomous vehicle or associated computing system can collect and store passenger input data and vehicle data as the autonomous vehicle executes a driving session. After the session has been completed, a log of the passenger input data and vehicle data can be transferred to a computing system that can determine adjusted vehicle parameters for autonomous vehicles according to the techniques described herein. As another example, in some implementations of the present disclosure, the passenger input data and associated vehicle data can be received and analyzed in real-time as the autonomous vehicle operates. For example, in some implementations, the vehicle parameter adjustment systems of the present disclosure can be located physically onboard the autonomous vehicle and can receive the vehicle data and passenger input data and adjust one or more vehicle parameters in real-time during an autonomous vehicle driving session. As yet another example, in some implementations, the passenger input data and vehicle data can include simulated data.

The passenger input data and associated vehicle data logs can be put into a machine-learned model to determine a vehicle parameter adjustment for one or more autonomous vehicle driving sessions. For example, the machine-learned model can receive the passenger input data indicative of a passenger experience and the associated vehicle data logs, and in response, provide a vehicle parameter adjustment to improve a passenger experience.

As examples, the machine-learned model can be or include one or more of: a random forest classifier; a logistic regression classifier; a support vector machine; one or more decision trees; a neural network; a k-nearest neighbors model; and/or other types of models including both linear models and non-linear models. Neural networks can include deep neural networks, feed-forward neural networks, recurrent neural networks (e.g., long short-term memory recurrent neural networks), convolutional neural networks, or combinations thereof. Various of the above described models can be boosted using Adaptive Boosting, Gradient Boosting, or other techniques.

In some implementations, the vehicle parameter adjustment can include a specific vehicle parameter to adjust (e.g., an operating parameter such as vehicle speed or stop duration) and/or an adjustment amount (e.g., a change in a deceleration rate or decrease in a stop duration).

In some implementations, the vehicle parameter adjustment can include a change in a cost data utilized for planning a vehicle motion of an autonomous vehicle. For example, the autonomous vehicle computing system can generate cost data indicative of an effect of performing a vehicle action. The cost data can include a cost function indicative of a cost (e.g., over time) of controlling the motion of the autonomous vehicle (e.g., the trajectory, speed, or other controllable parameters of the autonomous vehicle) to perform the vehicle action (e.g., stop, pass, ignore). The autonomous vehicle computing system can determine a motion plan for the autonomous vehicle based at least in part on the cost data. For example, the autonomous computing system can implement an optimization algorithm that considers the cost data associated with the vehicle action determined by the machine-learned model as well as other cost functions (e.g., based on speed limits, traffic lights, etc.) to determine optimized variables that make up the motion plan. In some implementations, the adjusted vehicle parameter can be an adjustment to cost data or a cost function, such as, for example, prioritizing or de-prioritizing one or more cost functions or increasing or decreasing cost data associated with a vehicle action.

In some implementations, the vehicle parameter adjustment can be an adjusted vehicle parameter based at least in part on a geographic location. For example, in some geographic regions, passengers and other vehicular traffic may be more or less willing to accommodate different driving actions. For example, in suburban or rural geographic locations, drivers may be more willing to accommodate longer in-lane stop durations than in urban geographic locations. Similarly, drivers on side streets may likewise be more willing to accommodate longer in-lane stop durations than drivers on multi-lane thoroughfares. In some implementations, the vehicle parameter adjustment can account for geographic differences by, for example, adjusting a vehicle parameter a different amount depending on the geographic location that an autonomous vehicle is operating in.

Once a vehicle parameter adjustment has been determined, the adjusted vehicle parameter can be implemented in the operation of an autonomous vehicle. For example, in some implementations, a centralized computing system can determine an adjusted vehicle parameter, and provide the adjusted vehicle parameter to a computing system on-board an autonomous vehicle. For example, the adjusted vehicle parameter can be communicated via one or more wired and/or wireless communication networks from the centralized computing system to the on-board computing system. An advantage provided by such a configuration is that an adjusted vehicle parameter can be provided to a plurality of autonomous vehicles, such as a fleet of autonomous vehicles operating in a particular geographic location.

In some implementations, a computing system on-board the autonomous vehicle can determine the adjusted vehicle parameter. For example, an autonomous vehicle can include an autonomous vehicle computing system, such as an autonomous vehicle computing system configured to determine a motion plan for the autonomous vehicle. In some implementations, the autonomous vehicle computing system can be configured to determine the adjusted vehicle parameter, and further can implement the adjusted vehicle parameter by, for example, using the adjusted vehicle parameter to control the motion of the autonomous vehicle. For example, the adjusted vehicle parameter can be adjusted cost data used to determine a motion plan for the autonomous vehicle. The motion plan can then be used by the autonomous vehicle to control the motion of the autonomous vehicle.

Once the machine-learned model has been trained, the systems and methods of the present disclosure can assist in determining vehicle parameter adjustments to improve passenger experiences based solely on passenger input data and associated vehicle data logs, thereby eliminating the need for human reviewers to manually review individual passenger experience events and determine vehicle parameter adjustments. Thus, as one technical benefit, the machine-learning-based systems of the present disclosure can greatly reduce the cost associated with evaluating and testing autonomous vehicle ride quality, as human reviewers are not required. In addition, the machine-learning-based systems of the present disclosure can easily be scaled to thousands of autonomous vehicles, which is in contrast to the inability to directly scale human reviewers for passenger experience event analysis. Likewise, the use of machine learned models enables vehicle parameter adjustments to be rendered at an extremely high rate (e.g., 1 second per adjustment).

As another technical benefit, the systems and methods of the present disclosure can provide more consistent and accurate results than human reviewers. In particular, instead of relying on individual judgments to determine which vehicle parameter to adjust and by how much, a single model or set of models can be used to incorporate a plurality of passenger input data sets to determine vehicle parameter adjustments that can improve and/or maximize passenger experiences. Further, the systems and methods of the present disclosure can allow for continuous refinement of the machine-learned model by, for example, introducing vehicle parameter adjustments and determining the associated effects on passenger experiences. For example, a vehicle parameter adjustment at a first amount may provide an incremental increase in passenger experiences, whereas a vehicle parameter adjustment at a second amount may provide an even larger incremental increase in passenger experiences. In some implementations, the machine-learned model can be iteratively refined by incorporating new sets of passenger input data and associated vehicle data logs in order to both fine tune the machine-learned model as well as incrementally improve passenger experiences.

As a further technical benefit, the systems and methods of the present disclosure can be applied to both real world vehicle data and simulated vehicle data. As significant amounts of autonomous vehicle testing and development can be performed within a simulated space, the ability to perform vehicle parameter adjustment on simulated vehicle data enables enhanced techniques for technological development. Improvements in autonomous vehicle technology that are enabled by the present disclosure can enhance ride quality, passenger comfort, and overall passenger experiences.

With reference now to the FIGS., example aspects of the present disclosure will be discussed in further detail. FIG. 1 depicts an example training configuration according to example aspects of the present disclosure. More particularly, according to an aspect of the present disclosure, existing passenger input data 203 that include vehicle parameter adjustment labels and vehicle data logs 204 that include vehicle parameter adjustment labels assigned by a human reviewer can be used to train a machine-learned model 110.

In particular, one or more passengers in one or more autonomous vehicle driving sessions can be surveyed to obtain passenger input data 203. For example, immediately following a passenger pick-up event, a human passenger can be surveyed to obtain passenger input data 203 indicative of the passenger's experience. Vehicle data 204 can similarly be obtained for the passenger pick-up event, such as sensor data and operating parameters for the vehicle for a period of time before the pick-up event until a period of time after the pick-up event.

In some implementations, the passenger input data 203 can include passenger responses to prompts developed by a human, such as an engineer. For example, in some implementations, an engineer may want to analyze how passengers feel about a particular aspect of an autonomous vehicle driving session. For example, the engineer can develop one or more prompts which can be provided to a passenger at an appropriate time to obtain the passenger input data 203. In some implementations, the prompts can be generated by a machine-learned model, such as the machine-learned models described herein.

In some implementations, the machine-learned model 110 can be trained using passenger input data 203 and associated vehicle data logs 204 that do not include any vehicle parameter adjustment labels. For example, the machine-learned model 110 can be trained using training data that includes passenger input data 203 and associated vehicle data logs 204 with one or more vehicle parameters varied under various situations. In some implementations, the machine learned model 110 can be trained to determine an adjusted vehicle parameter 111 that improves a passenger experience, such as by using a ratio, count, score, or other comparison of positive vs. negative experiences, or a mean, median, standard deviation, or other metric of the quality of passenger experiences for a plurality of autonomous vehicle driving sessions. For example, the machine-learned model 110 can be trained to determine an adjusted vehicle parameter 111 by adjusting a vehicle parameter to improve or maximize a passenger experience.

In some implementations, a human reviewer can use a review tool to provide vehicle parameter adjustment labels associated with the passenger input data 203 and associated vehicle data logs 204. The human reviewer can, for example, view a screenshot of the environment as observed by the autonomous vehicle for one or more events, such as one or more passenger pick-up events; watch a playback of vehicle data collected around the time of the one or more events; watch a playforward simulation of a simulated event in various scenarios; or other review actions and compare the vehicle data to the passenger's feedback. For example, the playback and/or the playforward tools can provide visualizations of sensor data such as, for example, visualizations of light detection and ranging data, radio detection and ranging data, imagery captured by the autonomous vehicle, etc. which can indicate traffic patterns or other environmental conditions during the event.

Upon reviewing the vehicle data 204 via the review tool, the human reviewer can determine a specific vehicle parameter to be adjusted for each reviewed scenario. In particular, in some implementations, the adjusted vehicle parameter label provided by the human reviewer for each passenger pick-up event can describe the reviewer's estimate of which vehicle parameter should be adjusted and by what metric and/or amount to improve a passenger's experience (e.g., increase or reduce a vehicle stop duration). The adjusted vehicle parameter label can be associated with the passenger input data and/or the vehicle data that was collected and stored by the autonomous vehicle contemporaneous to the passenger pick-up event.

The humanly-assigned vehicle parameter adjustment label can be attached to the vehicle data 204 collected by the autonomous vehicle at the time of the passenger input data 203. Thus, use of a human reviewer to provide manual vehicle parameter adjustment labels can result in a corpus of vehicle data logs 204 that include vehicle parameter adjustment labels that are associated with passenger input data 203 and corresponding vehicle data. According to an aspect of the present disclosure, such corpus of vehicle data logs 204 with vehicle parameter adjustment labels can be used to train the machine learned machine-learned model 110.

In some implementations, the machine-learned model can first be trained using training data that includes labels annotated by a human reviewer, and subsequently be trained using passenger input data 203 and associated vehicle data logs 204 that have not been annotated. For example, a machine-learned model 110 can first be trained to identify vehicle parameters to adjust under various operating scenarios, and be further refined using passenger input data 203 and associated vehicle data logs 204 to determine specific adjustment amounts that increase and/or maximize a passenger experience according to one or more metrics. For example, over a period of time, the machine-learned model 110 can iteratively adjusted vehicle parameter, such as a passenger pick-up stop duration, in order to increase and/or maximize a passenger experience as determined by passenger input data 203.

Once the machine-learned model 110 has been trained, the systems and methods of the present disclosure can assist in adjusting vehicle parameters completely based on passenger input data and associated vehicle logs.

Figure 2:
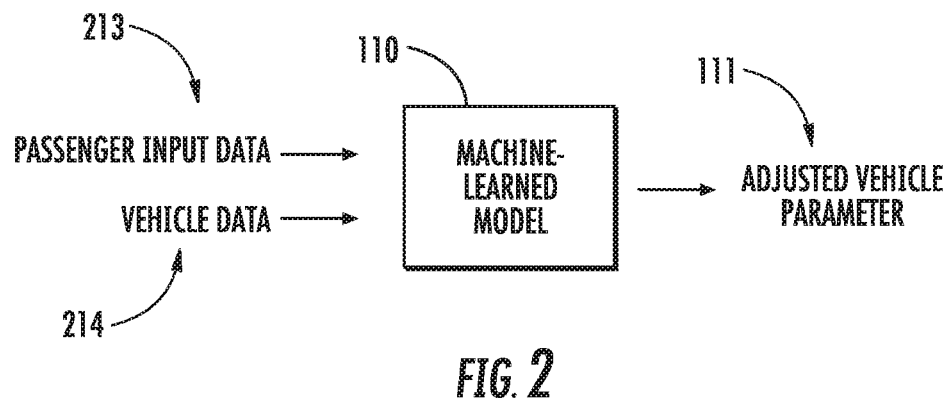
FIG. 2 depicts a block diagram of an example processing pipeline for adjusting a vehicle parameter according to example aspects of the present disclosure.

As an example, FIG. 2 depicts a block diagram of an example processing pipeline for vehicle parameter adjustment according to example embodiments of the present disclosure. The example processing pipeline of FIG. 2 includes a machine-learned model 110. The example processing pipeline of FIG. 2 can perform automatic determination of adjusted vehicle parameters 111 based on passenger input data 213 and associated vehicle data 214 associated with the autonomous vehicle. For example, the passenger input data 213 can be associated with a passenger experience for an autonomous driving session, and the vehicle data 214 can be descriptive of vehicle conditions associated with an autonomous vehicle during the autonomous driving session.

In some implementations, the passenger input data 213 can be collected by a human machine interface device onboard an autonomous vehicle or a user computing device as described herein. In some implementations, the passenger input data 213 can include whether a passenger experience was positive or negative. For example, in some implementations, passenger input data 213 can be obtained via a user interface which first prompts whether a passenger's experience was positive or negative. In some implementations, the passenger input data 213 can be associated with one or more of a pick-up event, a drop-off event, or an in-ride event. For example, following a passenger pick-up event, a passenger can be prompted to provide feedback indicative of the passenger's experience with the pick-up event such as, for example, by prompting the passenger to indicate whether the pick-up event was positive or negative. In some implementations, the feedback prompt can include additional granularity, such as a rating on a scale (e.g., 1-5), or using text descriptors (e.g., unacceptable, marginal, acceptable, good, excellent, etc.). In some implementations, passenger input data 213 can include open-ended feedback provided by a passenger. For example, a passenger in an autonomous vehicle can be prompted to provide verbal feedback describing a problem or frustration the passenger experienced during an autonomous vehicle driving session. In some implementations, the verbal feedback can be analyzed using voice recognition software, and further can be classified based on the feedback provided.

In some implementations, the passenger input data 213 can include passenger responses to prompts developed by a human, such as an engineer. For example, in some implementations, an engineer may want to analyze how passengers feel about a particular aspect of an autonomous vehicle driving session. For example, the engineer can develop one or more prompts which can be provided to a passenger at an appropriate time to obtain the passenger input data 213. In some implementations, the prompts can be generated by a machine-learned model, such as the machine-learned models described herein.

In some implementations, the vehicle data 214 can include data collected by or otherwise received from various sensors included in the autonomous vehicle. As examples, the vehicle data 214 can include data descriptive of a speed (also referred to as velocity), a steering angle, an acceleration or deceleration, a braking amount, a vehicle class, operation of an adaptive cruise control system, a vehicle location, a vehicle stop duration, a proximity to a pick-up location, a proximity to a drop-off location, and/or any other conditions or operating parameters associated with the autonomous vehicle. As further examples, the vehicle data 214 can include various other types of data descriptive of vehicle conditions, including, for example: light detection and ranging data; radio detection and ranging data; imagery collected by one or more cameras onboard the autonomous vehicle; weather condition data; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data 214 associated with the vehicle (e.g., collected or produced by sensors or systems onboard the vehicle). As further examples, the vehicle data 214 can include one or more passenger comfort settings, such as air conditioning system settings (fan speed, temperature setpoint, etc.), ergonomic settings (seat incline/recline, forward/backward position, height, or other setting), cabin settings (cabin light setpoints, audio system volume levels, audio station settings, etc.), or other passenger comfort settings.

In some implementations, the vehicle data 214 can be indicative of one or more conditions associated with the environment of the autonomous vehicle. For example, the one or more conditions can be one or more of a vehicle traffic condition, a vehicle behavior, a pedestrian behavior, or an object proximate to the autonomous vehicle. For example, a vehicle traffic condition can be determined by, for example, sensor data indicative of one or more vehicles proximate to the autonomous vehicle during operation of the autonomous vehicle. For example, LIDAR or RADAR data obtained by one or more sensors of the autonomous vehicle can be indicative of vehicle traffic conditions in which the autonomous vehicle is operating. Similarly, other vehicle data 214 can be obtained by the autonomous vehicle, such as data indicative of another vehicle's behavior. For example, the vehicle data 214 can include data regarding a motion of another vehicle, such as whether the vehicle stopped, turned, or other behavior. Likewise, the behavior of a pedestrian or an object proximate to the autonomous vehicle can also be obtained by the autonomous vehicle and included in vehicle data 214.

The passenger input data 213 and associated vehicle data 214 can be input into a machine-learned model 110 to receive an adjusted vehicle parameter 111. For example, the machine-learned model 110 can receive passenger input data 213 and associated vehicle data 214, and, in response, provide the adjusted vehicle parameter 111 based on the data. In some implementations, adjusted vehicle parameters 111 that are provided with low probability and/or low confidence can be marked as unknown and assessed manually.

As examples, the machine-learned model 110 can be or include one or more of: a random forest classifier; a logistic regression classifier; a support vector machine; one or more decision trees; a neural network; a k-nearest neighbors model; and/or other types of models including both linear models and non-linear models. Neural networks can include deep neural networks, feed-forward neural networks, recurrent neural networks (e.g., long short-term memory recurrent neural networks), convolutional neural networks, or combinations thereof. Various models described above can be boosted using Adaptive Boosting, Gradient Boosting, or other techniques.

In some implementations, the model 110 can include certain parameters, such as one or more limits/thresholds. For example, in some implementations, a human, such as an engineer, can define certain limits or thresholds within the model 110. For example, an engineer can set a maximum acceleration rate, a maximum velocity, a maximum stop duration, or other parameter, which can be incorporated into the model 110. In some implementations, the model 110 can determine the adjusted vehicle parameter 111 such that the adjusted vehicle parameter 111 is within such parameters, limits, and/or thresholds.

In some implementations, the vehicle parameter adjustment can include a specific vehicle parameter to adjust (e.g., an operating parameter such as vehicle speed or stop duration) and/or an adjustment amount (e.g., a change in a deceleration rate or decrease in a stop duration). As examples, a specific vehicle parameters which can be adjusted can include one or more of: a pick-up location traffic disruption duration; a pick-up location passenger walk distance (e.g., a maximum distance a passenger can be away from the pick-up location for the autonomous vehicle to wait for the passenger in-lane); a maximum pick-up location paid wait time; a maximum acceleration or deceleration rate; a maximum lateral acceleration; a maximum lateral force; a hold duration (e.g., a wait time for an obstacle to clear, can be dependent on class of object); a paid stop and hold duration (e.g., during an in-ride event); use of alternate routes; comfort settings (e.g. cabin temperature settings); a drop-off location traffic disruption duration; a drop-off location passenger walk distance (e.g., a maximum distance away from a drop-off input location the vehicle can stop when a suitable curbside spot is found); an air-conditioner temperature setpoint and/or fan speed; an audio system volume level or station; a seat position setting; or other vehicle parameters.

In some implementations, the adjusted vehicle parameter 111 can include a change in a cost data utilized for planning a vehicle motion of an autonomous vehicle. For example, the autonomous vehicle computing system can generate cost data indicative of an effect of performing a vehicle action. The cost data can include a cost function indicative of a cost (e.g., over time) of controlling the motion of the autonomous vehicle (e.g., the trajectory, speed, or other controllable parameters of the autonomous vehicle) to perform the vehicle action (e.g., stop, pass, ignore). The autonomous vehicle computing system can determine a motion plan for the autonomous vehicle based at least in part on the cost data. For example, the autonomous computing system can implement an optimization algorithm that considers the cost data associated with the vehicle action determined by the machine-learned model as well as other cost functions (e.g., based on speed limits, traffic lights, etc.) to determine optimized variables that make up the motion plan. In some implementations, the adjusted vehicle parameter 111 can be an adjustment to cost data or a cost function, such as, for example, prioritizing or de-prioritizing one or more cost functions or increasing or decreasing cost data associated with a vehicle action.

In some implementations, the vehicle parameter adjustment can be an adjusted vehicle parameter 111 based at least in part on a geographic location. For example, in some geographic regions, passengers and other vehicular traffic may be more or less willing to accommodate different driving actions. For example, in suburban or rural geographic locations, drivers may be more willing to accommodate longer in-lane stop durations than in urban geographic locations. Similarly, drivers on side streets may likewise be more willing to accommodate longer in-lane stop durations than drivers on multi-lane thoroughfares. In some implementations, the adjusted vehicle parameter 111 can account for geographic differences by, for example, adjusting a vehicle parameter a different amount depending on the geographic location that an autonomous vehicle is operating in. As examples, various vehicle parameters can have a global setting, which can be biased according to different geographic conditions or other conditions, such as specific streets as determined by map data, city vs. rural biases, trip-specific biases, such as whether a passenger has luggage, and/or passenger profile biases. For example, an in-lane traffic disruption parameter global setting (e.g., 10 seconds) can be adjusted up or down based on a city bias (e.g., −20% due to urban conditions), a map bias (e.g., +15% due to side-street location), a trip bias (e.g., +10% due to passenger luggage), and/or a profile bias (+20% due to passenger mobility), and individual bias amounts can be determined by the machine-learned model 110, as described herein. In some implementations, the adjusted vehicle parameter can include percentages, multipliers, discrete settings, or other parameters. In this way, a machine-learned model 110 can determine an adjusted vehicle parameter 111 based at least in part on passenger input data 213 and associated vehicle data 214.

Figure 3:
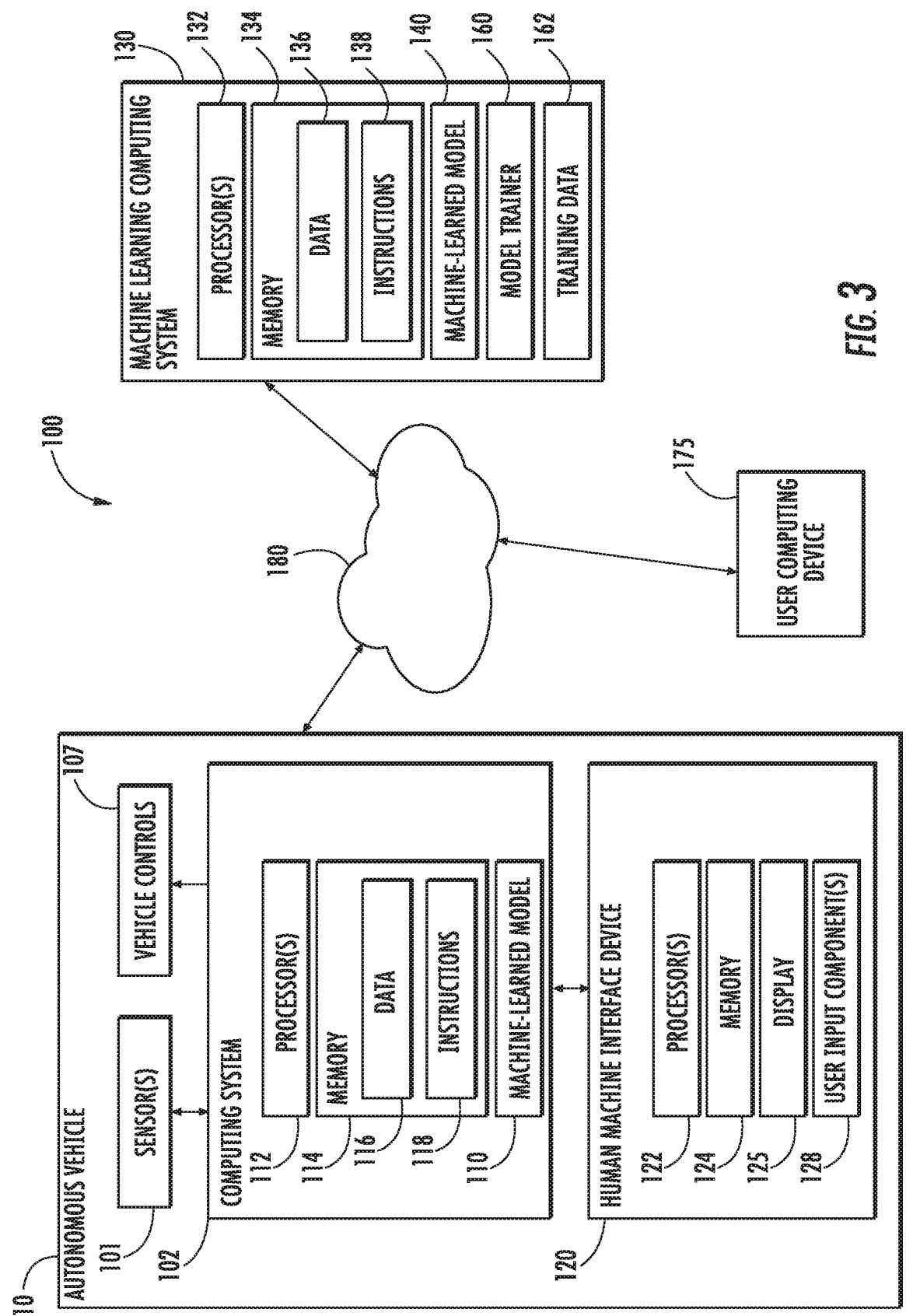
FIG. 3 depicts a block diagram of an example computing system according to example aspects of the present disclosure.

FIG. 3 depicts a block diagram of an example computing system 100 according to example embodiments of the present disclosure. The example computing system 100 includes an autonomous vehicle 10, a machine learning computing system 130, and a user computing device 175 that are communicatively coupled over one or more communication networks 180. The autonomous vehicle 10 can include one or more sensors 101, a vehicle computing system 102, one or more vehicle controls 107, and a human machine interface device 120. The sensors 101, vehicle computing system 102, and vehicle controls 107 will be discussed in further detail below with reference to FIG. 4.

The human machine interface device 120 can enable communication, control, and/or other interface actions to occur between the autonomous vehicle 10 and a human (e.g., a passenger located within the autonomous vehicle 10). The human machine interface device 120 can be communicatively coupled to the vehicle computing system 102 to enable exchange of data, instructions, and/or requests between the system 102 and the device 120.

The human machine interface device 120 can include or be implemented by one or more computing devices that are operatively connected. The human machine interface device 120 can be an embedded computing device or a stand-alone computing device. In one particular example, the human machine interface device 120 can be a tablet computing device that is positioned within the autonomous vehicle 10 (e.g., within a rear seat area of the autonomous vehicle 10).

The human machine interface device 120 can include one or more processors 122 and a memory 124. The one or more processors 122 can be any suitable processing device (e.g., a processor core, a microprocessor, an ASIC, a FPGA, a controller, a microcontroller, etc.) and can be one processor or a plurality of processors that are operatively connected. The memory 124 can include one or more non-transitory computer-readable storage media, such as RAM, ROM, EEPROM, EPROM, one or more memory devices, flash memory devices, etc., and combinations thereof.

The memory 124 can store information that can be accessed by the one or more processors 122. For instance, the memory 124 (e.g., one or more non-transitory computer-readable storage mediums, memory devices) can store data that can be obtained, received, accessed, written, manipulated, created, and/or stored. The memory 124 can also store computer-readable instructions that can be executed by the one or more processors 122. The instructions can be software written in any suitable programming language or can be implemented in hardware. Additionally, or alternatively, the instructions can be executed in logically and/or virtually separate threads on processor(s) 122. For example, the memory 124 can store instructions that when executed by the one or more processors 122 cause the one or more processors 122 to perform any of the operations and/or functions described herein.

According to an aspect of the present disclosure, the human machine interface device 120 can facilitate the prompting, collection, and/or entry of autonomous vehicle passenger input data. In particular, the human machine interface device 120 can utilize one or more interactive user interfaces to enable passengers to enter passenger input data descriptive of a passenger experience.

In particular, according to an aspect of the present disclosure, the human machine interface device 120 and/or the vehicle computing system 102 can prompt the passenger to provide feedback regarding his/her subjective response to one or more events during an autonomous vehicle driving session, such as a pick-up event, an in-ride event, and/or a drop-off event. In such fashion, passenger feedback regarding specific instances and/or types of driving events can be collected, enabling more advanced and granular understanding and refinement of the autonomous vehicle technology relative to particular types of driving events and/or particular physical locations.

In some implementations, the human machine interface device 120 can include a display device 125 (e.g., a touch-sensitive display device) and/or other input/output components 128 that provide an interactive user interface (e.g., through which the passenger can provide passenger feedback). For example, the display device 125 can be a rear-seat display device that is accessible by a passenger that is located in a rear seat of the autonomous vehicle 10.

Referring again to FIG. 3, in some implementations, in addition or alternatively to the human machine interface device 120, the systems and methods of the present disclosure can include or leverage a user computing device 175 that is associated with the passenger. For example, in some implementations, in addition or alternatively to the display of the user interface by the human machine interface device 120, the interactive user interface can be provided on or accessible via a display of the user computing device 175. The user computing device 175 can be communicatively connected to the human machine interface device 120 via a local area network such as a short range wireless connection (e.g., a Bluetooth, ZigBee, NFC, infrared, etc.) or other forms of connections (e.g., hardwiring). As examples, the user computing device 175 can be a smartphone, tablet computing device, wearable computing device, portable gaming device, hand-held display screen, or other forms of computing devices. In some implementations, the user computing device 175 can be connected to the computing system 100 via the network 180.

In some implementations, the computing system illustrated in FIG. 1 can provide an interactive user interface. For example, the user interface can be displayed on a display portion 125 of the human machine interface device 120 (e.g., a rear-seat display, handheld display, etc.), on a display of the user computing device 175, or in other manners or locations. The interactive user interface can enable a passenger of the autonomous vehicle 10 to enter passenger feedback (i.e., passenger input data) regarding the passenger's experience during an autonomous vehicle driving session. For example, a touch-sensitive display can receive passenger feedback via touch. Other input components 128 can be used as well such as, for example, a mouse, a keyboard or keypad, a touch pad, a click wheel, keyboard, ball, etc.

In some implementations, the user interface is not displayed on a display device (e.g., display 125), but instead may be, as one example, audio-based. For example, a speaker included in the human machine interface device 120 or other system component may prompt the user to provide a voice response that includes passenger feedback regarding an event during an autonomous vehicle driving session. For example, a personal assistant or other artificial intelligence-based technology can interact with the passenger via voice conversation to obtain feedback.

As another example, the user interface can be embodied in one or more physical buttons, knobs, sliders, levers, or other user input components 128 which enable a user to provide passenger feedback through manipulation of such physical components.

As yet another example, passenger feedback can be obtained through analysis of imagery captured by a camera. For example, computer vision techniques can be applied to imagery to assess or identify gestures, speech, eye movement, and/or facial expressions indicative of passenger comfort and/or satisfaction (e.g., thumbs up versus thumbs down).

As yet another example, passenger feedback can be obtained from other sensors 101 of the autonomous vehicle 10. For example, in some implementations, LIDAR and/or RADAR sensors can be configured to obtain passenger feedback by, for example, obtaining data indicative of a passenger's gestures, facial expression, body language, movements, etc. Similarly, in some implementations, pressure sensors can be positioned to obtain passenger feedback, such as when a passenger shifts his/her weight in response to a tight turn or presses his/her foot down on the floor to mimic a braking action. Other sensors 101 which can be used to obtain passenger feedback can include Sound Navigation and Ranging (SoNAR) sensors, other distance and ranging sensors, infrared cameras, flash and/or ambient light sensors, speakers, microphones, high resolution and/or dynamic ranging cameras, proximity sensors, light array sensors, and/or other sensors.

In some implementations, after or concurrent with receiving the passenger feedback, the human machine interface device 120, vehicle computing system 102, or other system component can associate the passenger feedback with vehicle data. For example, when a passenger provides passenger feedback, the autonomous vehicle can record or otherwise store collected data, such as data indicative of one or more operating parameters of the autonomous vehicle and/or data indicative of one or more conditions associated with the environment of the autonomous vehicle. As examples, such as vehicle data can include data indicative of a vehicle speed, a vehicle acceleration, a vehicle deceleration, a vehicle location, a vehicle stop duration, a proximity to a pick-up location, a proximity to a drop-off location, vehicle traffic conditions, vehicle behavior(s), pedestrian behavior(s), objects proximate to the autonomous vehicle, or other data. The passenger provided input data can be attached or otherwise associated to the data collected by the autonomous vehicle at such time. Thus, passenger input data and associated vehicle data can result in a corpus of data logs that are generally aligned in time with data that reflects a passenger experience. According to an aspect of the present disclosure, such corpus of data logs can be used to train the machine-learned model.

However, obtaining passenger input data can, in some instances, cause a delay between when passenger experience occurred (e.g., a pick-up event) and when the record was created, thereby leading to at least some of the vehicle data logs having a slight delay in their timestamp relative to when the passenger experience occurred. To remedy this issue, in some implementations, the systems of the present disclosure can associate passenger input data to particular events. For example, for a pick-up event, the systems and methods of the present disclosure can allow for recording or otherwise storing vehicle data for a window of time before the pick-up event occurred until some period of time after the pick-up event. Similarly, for any in-ride events and/or drop-off events, vehicle data can be obtained within a window around when a particular event occurred. As an example, for an in-ride event in which a passenger indicates that an acceleration of the autonomous vehicle 10 was high, all potential events of high acceleration (e.g., instances in which acceleration is greater than a threshold value) within a threshold time frame (e.g., a sixty second window prior to the passenger inputting the data indicative of a high acceleration) can be labeled as positives for high acceleration events. In other implementations, candidate events within the time window can be identified as described above (e.g., through identification of relative peaks in scale components), and the event can be associated with the passenger input data. In some implementations, passenger input data can be obtained for discrete events, such as pick-up and drop-off events. Other techniques can be used to associate passenger input data to vehicle data as well.

In some implementations, associating the passenger input data with vehicle data can include storing the passenger input data in a database or other data representation where it is relationally associated with such one or more items. The passenger feedback can be stored locally (e.g., by memory 114 of the vehicle computing system 102 or memory 124 of a human machine interface device 120) and then transferred to the machine learning computing system 130 as a batch offline and/or can be transmitted to the machine learning computing system 130 as soon as it is received by the vehicle 10 from the passenger.

In some implementations, certain operations described herein can be performed by a machine learning computing system 130 that is remotely located to the autonomous vehicle 10 and in communication with the autonomous vehicle 10 over one or more wireless networks 180 (e.g., cellular data networks, satellite communication networks, wide area networks, etc.). As an example, the machine learning computing system 130 can include one or more server computing devices. In the event that plural server computing devices are used, the server computing devices can be arranged according to a parallel computing architecture, a sequential computing architecture, or combinations thereof In some implementations, the machine learning computing system 130 can provide control, monitoring, management, and/or other functionality for a fleet of autonomous vehicles 10. For example, in some implementations, the machine learning computing system 130 can determine an adjusted vehicle parameter for a plurality of autonomous vehicles, and can provide the adjusted vehicle plurality to the fleet of autonomous vehicles via the network 180.

In some implementations, the vehicle computing system 102 can adjust one or more vehicle parameters as described herein. In some implementations, the vehicle computing system 102 can be on-board an autonomous vehicle. In other implementations, the machine learning computing system 130 or other computing system not on-board the autonomous vehicle can adjust a vehicle parameter, and provide the adjusted vehicle parameter to the autonomous vehicle 10. The vehicle computing system 102 can include one or more distinct physical computing devices.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

According to an aspect of the present disclosure, the vehicle computing system 102 can store or include one or more machine-learned models 110. For example, the machine-learned model 110 can be or can otherwise include various machine-learned models such as support vector machines, neural networks (e.g., deep neural networks), or other multi-layer non-linear models. Example neural networks include feed-forward neural networks, recurrent neural networks (e.g., long short-term memory recurrent neural networks), or other forms of neural networks.

In some implementations, the vehicle computing system 102 can receive the one or more machine-learned models 110 from the machine learning computing system 130 over network 180 and can store the one or more machine-learned models 110 in the memory 114. The vehicle computing system 102 can then use or otherwise implement the one or more machine-learned models 110 (e.g., by processor(s) 112).

In some implementations, the vehicle computing system 102 can receive the one or more adjusted vehicle parameters from the machine-learning computing system 130 over network 180 and store the adjusted vehicle parameter(s) in the memory 114. As an example, the machine learning computing system 130 can provide an adjusted vehicle parameter to the computing system 102, which can store the adjusted vehicle parameter in the memory 114. The adjusted vehicle parameter can then be implemented by the computing system 102 by, for example, using the adjusted vehicle parameter in determining a motion plan for the autonomous vehicle 10, as described herein.

The vehicle computing system 102 can also include a network interface (not shown) used to communicate with one or more systems or devices, including systems or devices that are remotely located from the vehicle computing system 102. The network interface can include any circuits, components, software, etc. for communicating with one or more networks (e.g., 180). In some implementations, the network interface can include, for example, one or more of a communications controller, receiver, transceiver, transmitter, port, conductors, software and/or hardware for communicating data.

Referring again to FIG. 3, the machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132. For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof In addition or alternatively to the model(s) 110 at the vehicle computing system 102, the machine learning computing system 130 can include one or more machine-learned models 140. For example, the machine learned model(s) 140 can be or can otherwise include various machine-learned models such as support vector machines, neural networks (e.g., deep neural networks), or other multi-layer non-linear models. Example neural networks include feed-forward neural networks, recurrent neural networks (e.g., long short-term memory recurrent neural networks), or other forms of neural networks.

As an example, the machine learning computing system 130 can communicate with the vehicle computing system 102 according to a client-server relationship. For example, the machine learning computing system 140 can implement the machine-learned model(s) 140 to provide a web service to the computing system 102. For example, the web service can provide adjusted vehicle parameters to the vehicle computing system 102, such as, for example, adjusted vehicle parameters for a geographic location.

Thus, machine-learned models 110 can be located and used at the vehicle computing system 102 and/or machine-learned models 140 can be located and used at the machine learning computing system 130.

In some implementations, the machine learning computing system 130 and/or the computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data 162. In other implementations, the model trainer 160 can perform unsupervised training techniques using a set of unlabeled training data 162. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, the passenger input data 213 and associated vehicle data logs 214 that does not include with vehicle parameter adjustment labels. For example, the model trainer 160 can be configured to determine particular vehicle parameters associated with particular passenger experiences. In some implementations, the model trainer 160 can be configured to adjust a vehicle parameter in order to increase or maximize a passenger experience.

According to another aspect of the present disclosure, passenger input data 203 and associated vehicle data logs 204 that include vehicle parameter adjustment labels recorded by a human reviewer can be used to train the machine-learned model(s) 110 and/or 140. In particular, a human reviewer can review passenger input data and associated vehicle data logs and label vehicle parameter(s) to be adjusted and/or adjustment amounts as described herein.

According to another aspect of the present disclosure, in some implementations, the machine-learned model(s) 110 and/or 140 can be iteratively refined by incorporating new sets of passenger input data 213 and associated vehicle data logs 214 in order to both fine tune the machine-learned model(s) 110 and/or 140 as well as incrementally improve passenger experiences. For example, in some implementations, the machine-learned model(s) 110 and/or 140 can first be trained using passenger input data 203 and associated vehicle data logs 204 that include vehicle parameter adjustment labels recorded by a human reviewer, and subsequently be trained using the passenger input data 213 and associated vehicle data logs 214 that does not include vehicle parameter adjustment labels. In this way, the machine-learned model(s) 110 and/or 140 can be refined according to passenger input data reflecting real-world passenger preferences.

The model trainer 160 includes computer logic utilized to provide desired functionality, and can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The machine learning computing system 130 can also include a network interface (not shown) used to communicate with one or more systems or devices, including systems or devices that are remotely located from the machine learning computing system 130. The network interface can include any circuits, components, software, etc. for communicating with one or more networks (e.g., 180). In some implementations, the network interface can include, for example, one or more of a communications controller, receiver, transceiver, transmitter, port, conductors, software and/or hardware for communicating data.

The network(s) 180 can be any type of network or combination of networks that allows for communication between devices. In some embodiments, the network(s) 180 can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 3 illustrates one example computing system 100 that can be used to implement the present disclosure. Other computing systems can be used as well. For example, in some implementations, the vehicle computing system 102 can include the model trainer 160 and the training dataset 162. In such implementations, the machine-learned models 110 can be both trained and used locally at the vehicle computing system 102. As another example, in some implementations, the vehicle computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 4:
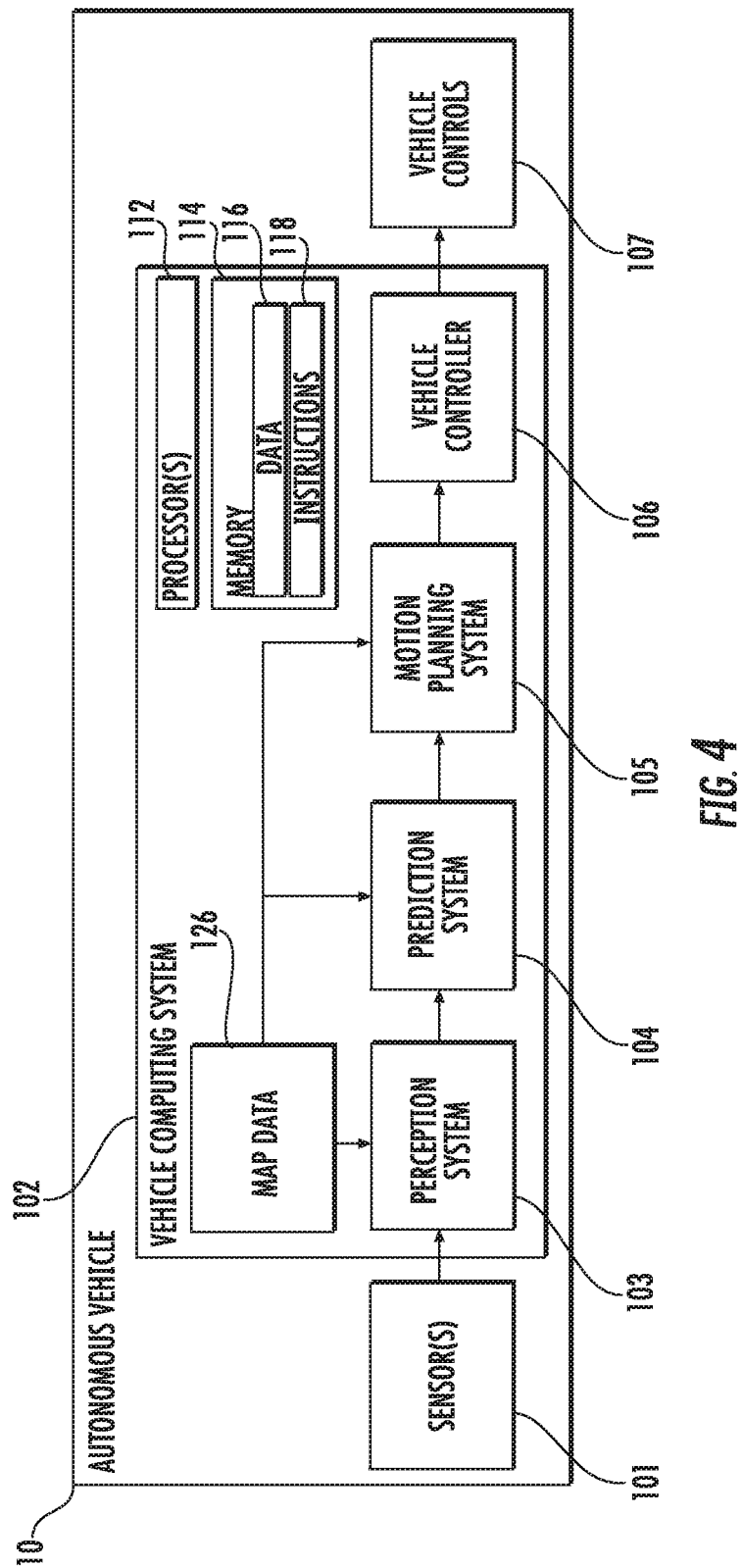
FIG. 4 depicts a block diagram of an example autonomous vehicle according to example embodiments of the present disclosure.

Referring now to FIG. 4, an example autonomous vehicle 10 according to example aspects of the present disclosure is depicted. As noted with respect to FIG. 3, the autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

As illustrated in FIG. 4, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), accelerometers (e.g., inertial measurement units, accelerometers, etc.) and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. As described herein, sensor data obtained by the one or more sensors 101 can be stored as vehicle data 214. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations. In some implementations, the motion planning system 105 can determine the motion plan for the autonomous vehicle using one or more adjusted vehicle parameters, as described herein.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 5:
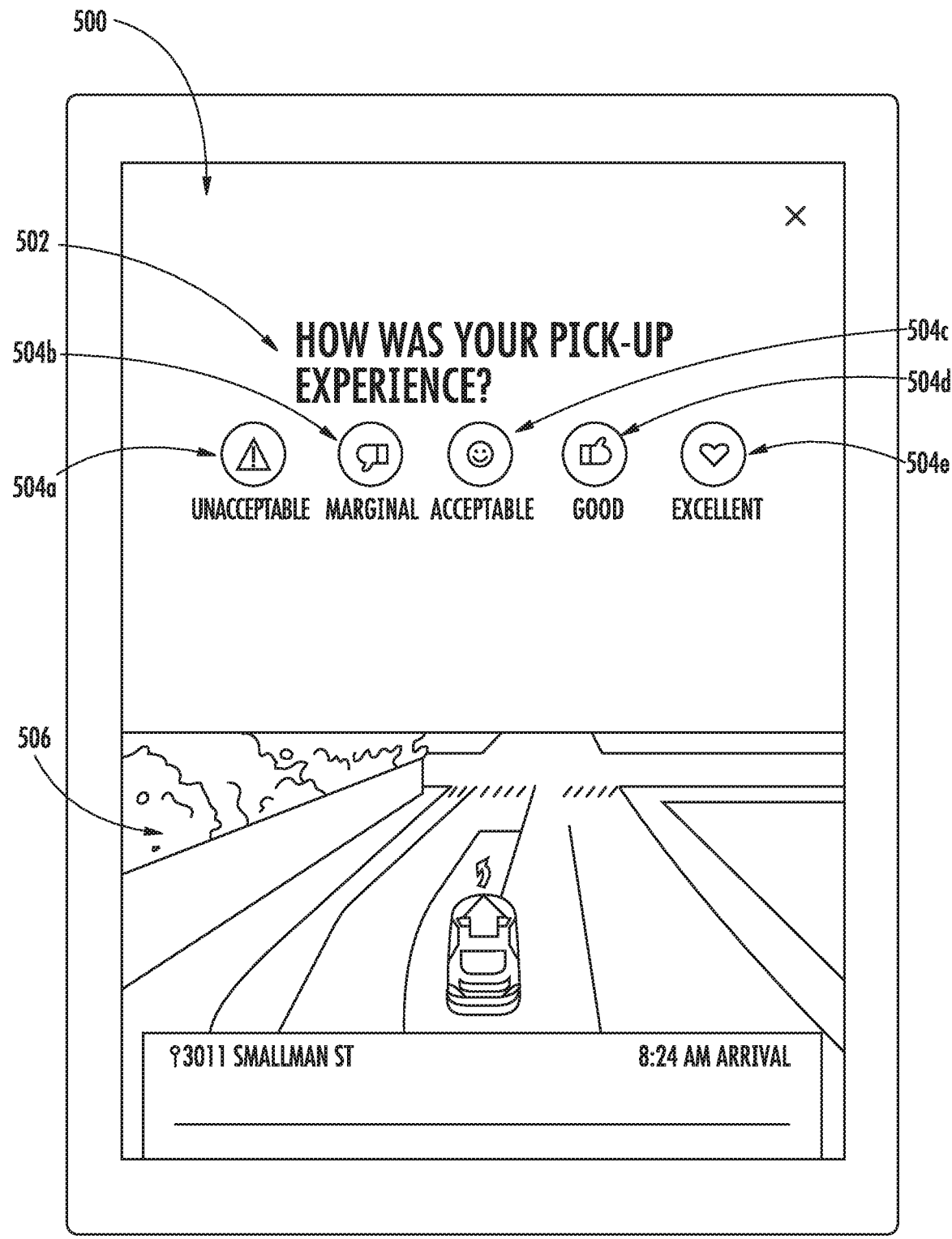
FIG. 5 depicts an example interactive user interface according to example aspects of the present disclosure.
Figure 6:
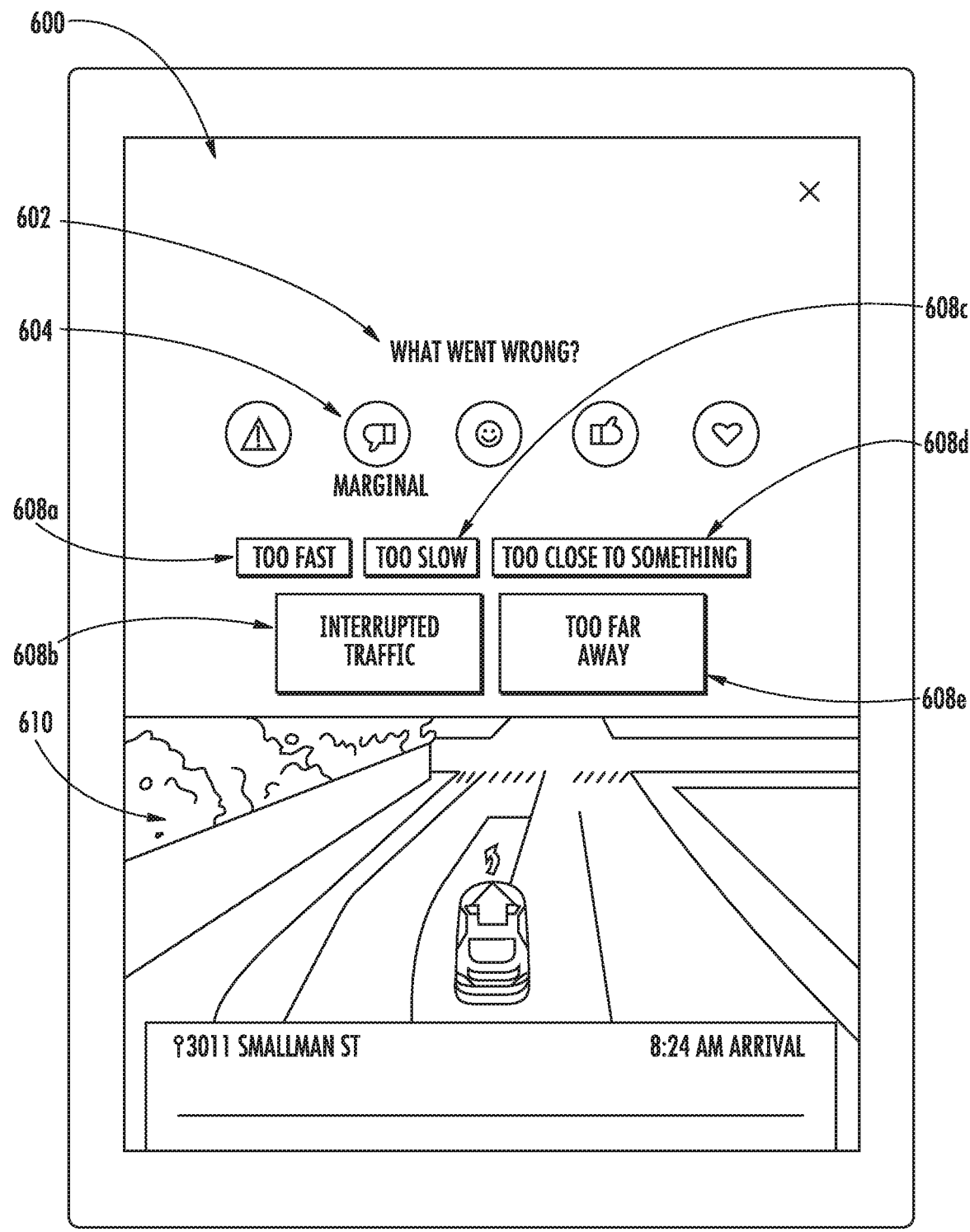
FIG. 6 depicts an example interactive user interface according to example embodiments of the present aspects.

Referring now to FIGS. 5 and 6, example interactive user interfaces according to example aspects of the present disclosure are depicted. As noted with respect to FIG. 3, the systems of the present disclosure can provide an interactive user interface to enable a passenger of the autonomous vehicle to enter passenger feedback regarding the passenger's experience. FIGS. 5 and 6 depict example user interfaces according to example embodiments of the present disclosure. The user interfaces shown in FIGS. 5 and 6 are provided as examples only. Different user interfaces with different features, arrangements, or interactivity can be used in addition or alternatively to the user interfaces shown in FIGS. 5 and 6.

As one example user interface that can be provided following a passenger pick-up event, FIG. 5 depicts an example interactive user interface 500 according to example embodiments of the present disclosure. As one example, FIG. 5 depicts an example user interface 500 that includes a plurality of user-selectable icons 504*a-e* that respectively correspond to a plurality of levels of satisfaction with the passenger's pick-up experience. In some implementations, the user interface 500 can be provided in response to receipt of an indication that a passenger desires to provide passenger feedback (e.g., following a passenger selecting an option to provide feedback). In other implementations, the user interface 500 can be provided automatically following the pick-up event (e.g., without receiving an indication that the user desires to provide feedback).

Referring still to FIG. 5, the passenger can select one of the plurality of user-selectable icons 504*a-e* to provide passenger feedback indicative of the corresponding level of satisfaction. For example, the user-selectable icons 504*a-e* can correspond to a positive or negative passenger experience. As one example, the user-selectable icons 504*a-e* can correspond to unacceptable, marginal, acceptable, good, and excellent. However, many other divisions or levels of satisfaction can be used instead of these example levels. For example, in some implementations, a passenger can provide a numerical rating, such as a rating on a scale from 1 to 5.

A message or header 502 can be provided adjacent to (e.g., above) the icons 504a-e to provide a context for the passenger feedback. For example, the message 502 can identify the event relative to which passenger feedback is requested (e.g., "How was your pick-up experience?").

In some implementations, the plurality of user-selectable icons 504a-e can include graphical and/or textual indicators that assist the passenger in selecting the appropriate icon 504a-e. Thus, as illustrated in FIG. 5, textual indicators can be provided that describe the corresponding level of satisfaction. Additionally or alternatively, graphical indicators can be provided that describe the corresponding level of satisfaction, as are also illustrated in FIG. 5.

In some implementations, the plurality of user-selectable icons can be included within a single graphical item (e.g., a plurality of user-selectable notches along an axis or a plurality of user-selectable notches on a dial). In some implementations, rather than discrete levels of satisfaction, a slider, dial, knob or other physical or virtual feature can enable the passenger to provide feedback along a continuous spectrum of satisfaction level.

In addition, in some implementations, the user interface 500 can include a visualization 506 of the autonomous vehicle during performance of the event (e.g., pick-up event). As one example, the visualization 506 can visualize or otherwise be generated based at least in part on light detection and ranging data collected by the autonomous vehicle during performance of the event. Providing the visualization 506 of the autonomous vehicle during performance of the detected driving event within the user interface can enable the passenger to visually review the driving event when providing the passenger feedback.

In some implementations, the interactive user interface 500 can be specific to and associated with a particular event. As one example, different sets of user-selectable icons 504a-e can be provided respectively for different events, such as pick-up events, in-ride events, and/or drop-off events. As another example, different identifiers can be provided within the interactive user interface 500 to help distinguish each event from other events. To provide an example, a textual, map-based, or other visual identifier(s) (e.g., in addition to message 502) can identify a pick-up event from a drop-off event, etc. In some implementations, the message 502 can be an open-ended prompt.

Any other aspects of the user interface 500 (e.g., font, formatting, size, number of icons, type of icons, number of identifiers, type of identifiers, etc.) can be modified to provide interfaces that are specific to respective event(s).

In some implementations, the user interface 500 can prompt a passenger to provide input data indicative of a passenger experience, and passenger input can be verbally provided by the passenger. For example, in some implementations, a message 502 can prompt a passenger to provide passenger input, which can be recorded by one or more microphones. As an example, a message 502 can be an open-ended prompt, and a passenger can provide passenger input data by, for example, verbally describing the passenger's experience.

In some implementations, in response to receiving a passenger feedback that selects one of the plurality of user-selectable icons 504a-e, the systems of the present disclosure can transition the user interface to subsequently provide a secondary menu that provides a second plurality of user-selectable icons.

As one example, FIG. 6 depicts an example user interface 600 that includes a second plurality of user-selectable icons 608a-e. As one example, the second plurality of user-selectable icons 608a-e can respectively correspond to a plurality of textual phrases that respectively describe different reasons for the indicated level of satisfaction. In some implementations, the previously selected level of satisfaction can be highlighted as shown at 604. As examples, the textual phrases can include phrases such as "too fast," "too slow," "too close to something," "interrupted traffic," "too far away", etc.

In other implementations, the second plurality of user-selectable icons 608a-e are not textual in nature but instead include a graphical depiction of different reasons for the indicated level of satisfaction (e.g., a graphical depiction of a vehicle interrupting traffic). Different textual phrases or graphical icons can be used depending on the nature of the feedback prompt provided to the passenger.

The user interface 600 can further include a message 602 that provides a context for the icons 608a-e. In some implementations, as illustrated in FIG. 6, the first plurality of icons that correspond to levels of satisfaction can remain within the user interface 600 while the second plurality of user-selectable icons 608a-e are provided. For example, the selected icon/level of satisfaction can be highlighted as shown at 604. Alternatively, only the selected icon/level of satisfaction 604 may remain while the other icons/levels of satisfaction are removed. In yet further implementations, the first plurality of icons that correspond to levels of satisfaction are removed from the user interface 600 when the second plurality of user-selectable icons 608a-e are provided.

In some implementations, the interactive user interface 600 can be specific to and associated with the particular feedback prompt provided to the passenger. Stated differently, different secondary menu items 608a-e can be provided respectively for different events, such as pick-up events, drop-off events, or in-ride events. For example, secondary menu items provided in response to a turning in-ride event can include textual phrases specific to turning events (e.g., "turned too wide," "turned too narrow," etc.), while secondary menu items provided in response to a stopping in-ride event can include textual phrases specific to stopping events (e.g., "stopped too late," "stopped too early," etc.). Thus, in some implementations, while the first plurality of icons that correspond to levels of satisfaction are consistent across different event types, the second plurality of icons 608a-e can be specific to the particular type of event for which passenger feedback is requested.

In some implementations, the interactive user interface 600 can be specific to and associated with the particular selected level of satisfaction. Stated differently, different sets of icons 608a-e can be provided depending on the level of satisfaction selected by the passenger. For example, the icons 608a-e illustrated in FIG. 6 provide respective textual descriptions of what went wrong. Therefore, the icons 608a-e illustrated in FIG. 6 can be displayed in response to selection of an icon (e.g., 604) that corresponds to a negative passenger experience. However, if the passenger had selected an icon that corresponded to a positive experience, the icons 608a-e could be different. In particular, in such scenario the icons 608a-e could provide respective textual phrases that describe what went right, or with which aspect the passenger felt satisfied.

Different identifiers can be provided within the interactive user interface to help distinguish each event from other events. To provide an example, a textual, map-based, or other visual identifier(s) can identify a particular turn or a particular stopping event.

Any other aspects of the user interface 600 (e.g., font, formatting, size, number of icons, type of icons, number of identifiers, type of identifiers, etc.) can be modified to provide interfaces that are specific to respective driving event(s) or passenger input indicative of a passenger experience.

In some implementations, the systems of the present disclosure modify the user interface (e.g., transition from interface 500 to interface 600) to provide the second plurality of icons 608a-e only when the passenger selects one of the plurality of user-selectable icons 504a-e that corresponds to a negative passenger experience (or some other defined subset of the icons or types of passenger feedback). For example, if passenger input indicates that a passenger had a positive experience, in some implementations, no additional prompts may be provided.

In some implementations, additional levels of hierarchical feedback menus beyond a primary and secondary menu can be used. For example, any number of hierarchies (tertiary menus, quaternary menus, etc.) organized according to different any number of different categories or schemes can be used.

In some implementations, the second plurality of icons 608a-e can be provided directly in response to passenger request to provide passenger feedback. For example, following an in-ride event, such as a sharp turn, a passenger can select an option to provide feedback.

In some implementations, the passenger feedback can be provided verbally by a passenger. For example, in some implementations, a passenger can provide passenger input by verbally indicating whether an event was a positive or negative experience and/or select an icon 608a-e by verbally answering a message 602.

In some implementations, passenger feedback can be provided in an open-ended fashion. For example, in some implementations, a passenger can select an option to provide feedback for which a corresponding interactive user interface is not displayed. In some implementations, the open-ended feedback can be provided verbally by a passenger.

In some implementations, open-ended passenger feedback can be used to determine additional passenger feedback categories. For example, in some implementations, open-ended passenger feedback can be analyzed, such as by a machine-learning algorithm, to determine additional passenger feedback categories for which an interactive user interface can be developed.

In some implementations, the interactive user interface can include a visualization 610 of the autonomous vehicle during an event for which passenger feedback is obtained. As one example, the visualization 610 can visualize or otherwise be generated based at least in part on light detection and ranging data collected by the autonomous vehicle during performance of the event. Providing the visualization 610 of the autonomous vehicle during performance of the detected driving event within the user interface 600 can enable the passenger to visually review the driving event while selecting from among the second plurality of icons 608a-e.

In some implementations, one or more of the interactive user interfaces 500 and 600 can request that the passenger provides passenger feedback that identifies a category of feedback to be provided by the passenger. For example, an interactive user interface(s) can request that the passenger provides passenger feedback that identifies a category for which the passenger is providing feedback. For example, the user interface(s) can request that the passenger provides passenger feedback by first selecting a general category (e.g., stopping in-ride event), which can allow for subcategories or specific types of events to then be selected (e.g., stopping at stop sign event vs. stopping at crosswalk event vs. stopping at traffic light event vs. stopping due to humanly-guided (e.g., traffic officer) traffic stop event, etc.). In this way, the systems and methods according to example aspects the present disclosure can allow for a passenger to provide passenger input data indicative of a passenger experience during one or more autonomous driving sessions.

Figure 7:
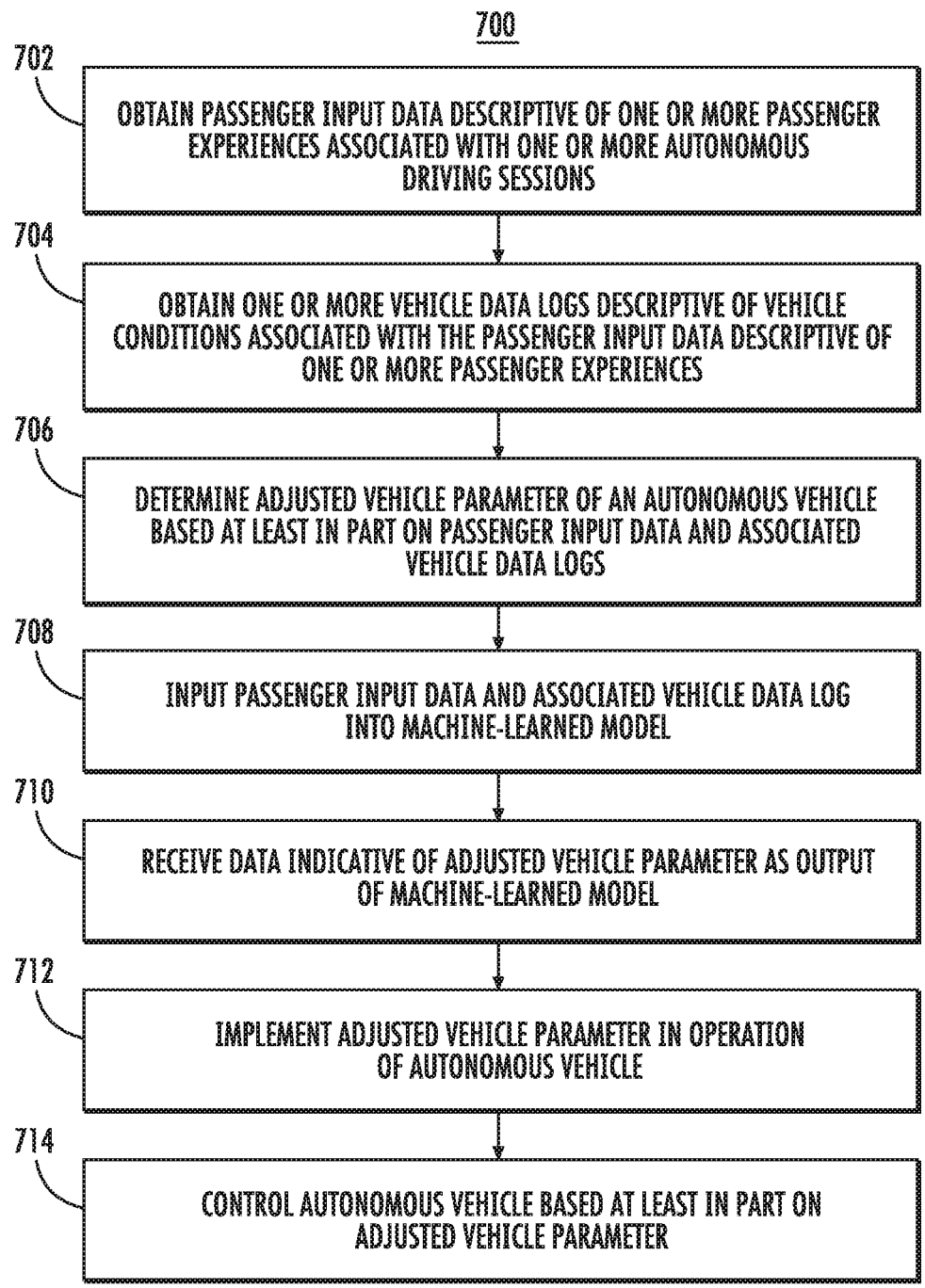
FIG. 7 depicts a flowchart diagram an example method for adjusting a vehicle parameter according to example aspects of the present disclosure.

Referring now to FIG. 7, an example method (700) to adjust a vehicle parameter for an autonomous vehicle according to example aspects of the present disclosure is depicted. Although FIG. 7 depicts steps performed in a particular order for purposes of illustration and discussion, the methods of the present disclosure are not limited to the particularly illustrated order or arrangement. The various steps of method (700) can be omitted, rearranged, combined, and/or adapted in various ways without deviating from the scope of the present disclosure.

At (702), a computing system obtains passenger input data descriptive of one or more passenger experiences associated with one or more autonomous driving sessions. For example, the computing system can include one or more computing devices that are on-board the autonomous vehicle or one or more computing devices external to the autonomous vehicle.

In some implementations, the passenger input data descriptive of one or more passenger experiences can be indicative of a positive or negative experience for one or more of a pick-up event, a drop-off event, or an in-ride event. For example, in some implementations, following a pickup-up event, a passenger can provide passenger input data indicative of the passenger's experience during a pickup-up event by, for example, providing feedback via an interactive user interface.

In some implementations, the passenger input data descriptive of one or more passenger experiences can be obtained via a human machine interface device on-board the autonomous vehicle. In some implementations, the passenger input data can be obtained via a user computing device, such as a passenger's smartphone.

In some implementations, the passenger input data can be descriptive of a plurality of passenger experiences associated with a plurality of autonomous driving sessions. For example, in some implementations, an adjusted vehicle parameter can be determined based on a plurality of passenger experiences during a plurality of similar events (e.g., a plurality of pick-up events).

At (704), the computing system can obtain one or more vehicle data logs descriptive of vehicle conditions associated with the passenger input data descriptive of one or more passenger experiences. For example, the vehicle data logs can include one or more operating parameters of an autonomous vehicle performing a vehicle action associated with the passenger input data. The one or more vehicle data logs can include, for example, data provided by or generated by a perception system, a prediction system, the motion planning system, one or more autonomous vehicle sensors, map data, or other vehicle data as described herein. For example, the one or more operating parameters can include one or more of: a vehicle speed, a vehicle acceleration, a vehicle deceleration, a vehicle location, a vehicle stop duration, a proximity to a pick-up location, a proximity to a drop-off location, or other operating parameter.

In some implementations, the one or more vehicle data logs can be indicative of one or more conditions associated with the environment of the autonomous vehicle. For example, the one or more conditions can include one or more of: a vehicle traffic condition, a vehicle behavior, a pedestrian behavior, a weather condition, an object proximate to the autonomous vehicle, or other environmental condition. For example, following a pick-up event, a passenger may provide passenger input data indicating that a pick-up event was a negative experience due to the autonomous vehicle interrupting traffic. In some implementations, and associated vehicle data logs can include data indicative of vehicle traffic conditions associated with the environment of the autonomous vehicle.

At (706) the computing system can determine an adjusted vehicle parameter of an autonomous vehicle based at least in part on passenger input data and associated vehicle data logs. In some implementations, the computing system can be on-board the autonomous vehicle, while in other implementations, the computing system can be external to the autonomous vehicle.

In some implementations, the adjusted vehicle parameter can be determined based on passenger input data indicative of a plurality of passenger experiences and associated vehicle data logs. For example, the computing system can aggregate multiple instances of passenger input data and associated vehicle data logs for a plurality of passenger experiences. The computing system can determine an adjusted vehicle parameter based on the aggregated data by, for example, adjusting a vehicle parameter to increase or maximize an aggregated passenger experience, such as by maximizing an average passenger experience. For example, in some implementations, the computing system can iteratively adjust a vehicle parameter over a period of time as additional passenger input data is received.

In some implementations, the computing system can implement a machine-learned model to determine an adjusted vehicle parameter of the autonomous vehicle. For example, the machine-learned model can adjust a vehicle stop duration in order to reduce the amount of time that the autonomous vehicle stops in-lane during a pick-up event in order to reduce the impact of the autonomous vehicle on other vehicle traffic.

In some implementations, the machine-learned model can be trained based at least in part on training data that includes passenger input data descriptive of passenger experiences and associated vehicle data logs that were previously collected during previous autonomous vehicle driving sessions, as described herein. In some implementations, the training data can further include labels provided by a human reviewer, wherein the labels include previously adjusted vehicle parameters associated with the passenger input data and associated vehicle data logs.

In some implementations, the computing system can determine the adjusted vehicle parameter by obtaining data descriptive of the machine-learned model. At (708), the computing system can input the passenger input data descriptive of one or more passenger experiences and the associated one or more vehicle data logs descriptive of vehicle conditions into the machine-learned model. At (710), the computing system can receive, as an output of the machine-learned model, data indicative of the adjusted vehicle parameter. In some implementations, the adjusted vehicle parameter can include a specific parameter to be adjusted and/or an adjustment amount.

At (712), the computing system can implement the adjusted vehicle parameter in the operation of the autonomous vehicle. For example, in some implementations, the computing system can be a vehicle computing system on-board the autonomous vehicle. The adjusted vehicle parameter can be implemented in the operation of the autonomous vehicle by, for example, using the adjusted vehicle parameter to control operation of the vehicle. For example, the adjusted vehicle parameter can be saved in a database, and accessed when determining a motion plan for the autonomous vehicle. In some implementations, the adjusted vehicle parameter can include adjusted cost data utilized for planning a motion of the autonomous vehicle.

In some implementations, the computing system can be a computing system external to the autonomous vehicle. For example, a machine learning computing system can be external to the autonomous vehicle, and can provide the adjusted vehicle parameter to a computing system on-board the autonomous vehicle by, for example, providing the adjusted vehicle parameter via a communication network, such as a wired or wireless network. In some implementations, the adjusted vehicle parameter can be provided to a plurality of autonomous vehicles, such as a fleet of autonomous vehicles.

In some implementations, the adjusted vehicle parameter can be based at least in part on a geographic location. For example, the adjusted vehicle parameter can be specific to an area (e.g., a rural area versus a city), a neighborhood, a type of street (e.g., a main thoroughfare vs. a side-street), or a specific street (e.g., $1^{st}$ Street vs. $2^{nd}$ Street). In some implementations, the adjusted vehicle parameter can be associated with map data.

At (714) the computing system can control the motion of the autonomous vehicle based at least in part on the adjusted vehicle parameter. For example, the adjusted vehicle parameter can be used in determining a motion plan by a motion planning system of the autonomous vehicle. A vehicle controller can then control operation of the autonomous vehicle by, for example, implementing the motion plan. In some implementations, a first computing system (e.g., a computing system external to the autonomous vehicle) can determine the adjusted vehicle parameter, and a second computing system (e.g., a computing system on-board the autonomous vehicle) can use the adjusted vehicle parameter to control operation of the autonomous vehicle.

Figure 8:
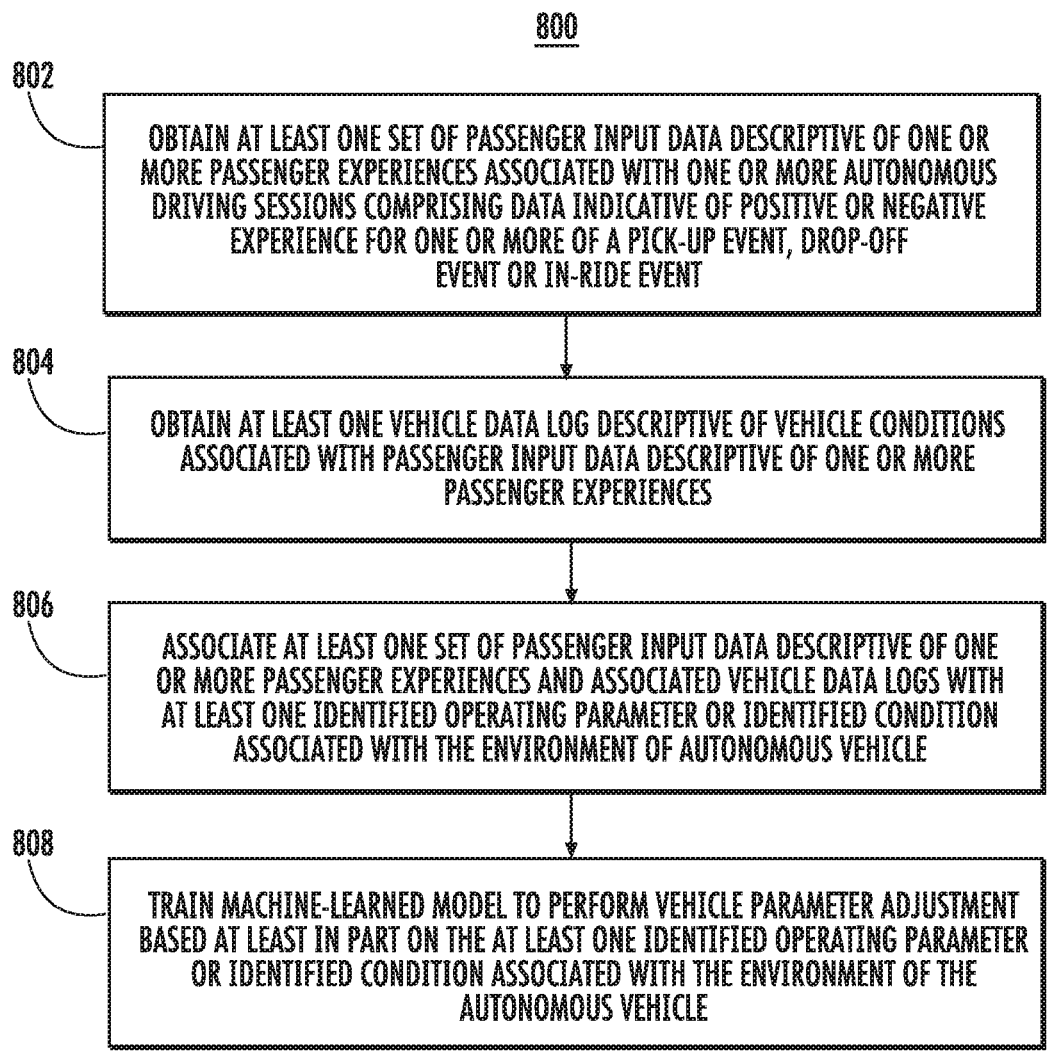
FIG. 8 depicts a flowchart diagram an example method for training a machine-learned model according to example aspects of the present disclosure.

Referring now to FIG. 8, an example method (800) to train a machine-learned model to adjust a vehicle parameter for an autonomous vehicle according to example aspects of the present disclosure is depicted. Although FIG. 8 depicts steps performed in a particular order for purposes of illustration and discussion, the methods of the present disclosure are not limited to the particularly illustrated order or arrangement. The various steps of method (800) can be omitted, rearranged, combined, and/or adapted in various ways without deviating from the scope of the present disclosure.

The method (800) can be implemented by a computing system, such as a computing system comprising one or more processors and one or more non-transitory computer-readable media that stores data. The data can include one or more sets of passenger input data descriptive of one or more passenger experiences associated with one or more autonomous driving sessions. For example, the passenger input data can include data indicative of a positive or negative experience for one or more of a pickup event, a drop-off event, or an in-ride event. The non-transitory computer-readable media can further store at least one vehicle data log descriptive of vehicle conditions associated with the passenger input data descriptive of one or more passenger experiences. For example, the vehicle data log can include one or more operating parameters of an autonomous vehicle performing a vehicle action associated with the passenger input data or data indicative of one or more conditions associated with the environment of the autonomous vehicle while the autonomous vehicle performed the vehicle action.

In some implementations, the one or more operating parameters can include one or more of a vehicle speed, a vehicle acceleration, a vehicle deceleration, a vehicle location, a vehicle stop duration, a proximity to a pick-up location, or a proximity to a drop-off location.

In some implementations, the one or more conditions associated with the environment of the autonomous vehicle can include one or more of a vehicle traffic condition, a vehicle behavior, a pedestrian behavior, or an object proximate to the autonomous vehicle.

In some implementations, the passenger input data descriptive of one or more passenger experiences associated with one or more autonomous driving sessions can include one or more adjusted vehicle parameter labels associated with the passenger input data and associated vehicle data logs. For example, the one or more adjusted vehicle parameter labels can be provided by a human reviewer of the passenger input data and associated vehicle data logs.

At (802), the computing system can obtain at least one set of passenger input data descriptive of one or more passenger experiences. For example, the computing system can access the passenger input data from the non-transitory computer-readable media.

At (804), the computing system can obtain at least one vehicle data log descriptive of vehicle conditions associated with the passenger input data. For example, the computing system can access the vehicle data log from the non-transitory computer-readable media.

At (806), the computing system can associate the at least one set of passenger input data descriptive of one or more passenger experiences and associated vehicle data logs with at least one operating parameter or condition associated with the environment of the autonomous vehicle. For example, the computing system can associate a positive or negative experience with a particular operating parameter or condition associated with the environment, such as, for example, associating a negative passenger experience caused by interrupting traffic with a vehicle stop duration for a pick-up event.

At (808), the computing system can train a machine-learned model to perform vehicle parameter adjustments based at least in part on the at least one operating parameter or condition associated with the environment of the autonomous vehicle. For example, the computing system can train the machine-learned model to reduce a vehicle stop duration for a pick-up event during high traffic conditions. In some implementations, the adjusted vehicle parameter can include adjusted cost data utilized for planning a motion of the autonomous vehicle.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to adjust a vehicle parameter for an autonomous vehicle, the method comprising:

obtaining, by a computing system comprising one or more computing devices, passenger input data descriptive of one or more experiences of one or more passengers associated with one or more autonomous driving sessions, the passenger input data comprising feedback provided by the one or more passengers;

obtaining, by the computing system, one or more vehicle data logs descriptive of vehicle conditions associated with the passenger input data, the one or more vehicle data logs descriptive of vehicle conditions associated with one or more autonomous vehicles during the one or more autonomous driving sessions in which the one or more passengers provided the feedback as passenger input data;

determining, by the computing system using a machine-learned model, an adjusted vehicle parameter of the one or more autonomous vehicles based at least in part on the passenger input data descriptive of the one or more experiences and the associated one or more vehicle data logs descriptive of vehicle conditions; and implementing, by the computing system, the adjusted vehicle parameter in an operation of the one or more autonomous vehicles.

2. The computer-implemented method of claim 1, wherein the machine-learned model has been trained based at least in part on training data that comprises previous passenger input data descriptive of passenger experiences and associated vehicle data logs that were previously collected during previous autonomous vehicle driving sessions.

3. The computer-implemented method of claim 2, wherein the training data includes labels comprising previously adjusted vehicle parameters associated with the previous passenger input data and associated vehicle data logs.

4. The computer-implemented method of claim 1, wherein determining, by the computing system, the adjusted vehicle parameter of the one or more autonomous vehicles autonomous vehicle based at least in part on the passenger input data descriptive of the one or more experiences and the associated one or more vehicle data logs descriptive of vehicle conditions comprises:

obtaining, by the computing system, data descriptive of the machine-learned model;

inputting, by the computing system, the passenger input data descriptive of the one or more experiences and the associated one or more vehicle data logs descriptive of vehicle conditions into the machine-learned model; and receiving, by the computing system, data indicative of the adjusted vehicle parameter as an output of the machine-learned model.

5. The computer-implemented method of claim 1, wherein implementing, by the computing system, the adjusted vehicle parameter in the operation of the one or more autonomous vehicles comprises:
providing, by the computing system, the adjusted vehicle parameter to a computing system on-board the one or more autonomous vehicles.

6. The computer-implemented method of claim 1, wherein the computing system comprises a computing system on-board the autonomous vehicle.

7. The computer-implemented method of claim 6, further comprising:
controlling a motion of the autonomous vehicle based at least in part on the adjusted vehicle parameter.

8. The computer-implemented method of claim 1, wherein the adjusted vehicle parameter comprises adjusted cost data utilized for planning a motion of the autonomous vehicle.

9. The computer-implemented method of claim 1, wherein the passenger input data indicative of the one or more experiences of the one or more passengers comprises data indicative of a positive or negative experience for one or more of a pick-up event, a drop-off event, or an in-ride event.

10. The computer-implemented method of claim 1, wherein the one or more vehicle data logs comprise one or more operating parameters of an autonomous vehicle performing a vehicle action associated with the passenger input data indicative of one or more passenger experiences; and
wherein the one or more operating parameters comprise one or more of: a vehicle speed, a vehicle acceleration, a vehicle deceleration, a lateral acceleration, a vehicle location, a vehicle stop duration, a proximity to a pick-up location, a proximity to a drop-off location, or a passenger comfort setting.

11. The computer-implemented method of claim 1, wherein the one or more vehicle data logs are indicative of one or more conditions associated with an environment of the autonomous vehicle; and
wherein the one or more conditions comprise one or more of: a vehicle traffic condition, a vehicle behavior, a pedestrian behavior, or an object proximate to the autonomous vehicle.

12. The computer-implemented method of claim 1, wherein the adjusted vehicle parameter is based at least in part on a geographic location.

13. The computer-implemented method of claim 1, wherein the passenger input data descriptive of the one or more experiences of the one or more passengers associated with the one or more autonomous driving sessions is obtained via a human machine interface device on-board the autonomous vehicle or via a user computing device.

14. The computer-implemented method of claim 1, wherein the passenger input data descriptive of the one or more experiences of the one or more passengers associated with the one or more autonomous driving sessions is obtained via one or more autonomous vehicle sensors.

15. A computing system comprising:
one or more processors; and
one or more non-transitory computer-readable media that collectively store:
at least one set of passenger input data descriptive of one or more experiences of one or more passengers associated with one or more autonomous driving sessions, the passenger input data comprising feedback provided by the one or more passengers indicative of a positive or negative experience for one or more of a pick-up event, a drop-off event, or an in-ride event; and
at least one vehicle data log descriptive of vehicle conditions associated with the passenger input data descriptive of the one or more experiences of the one or more passengers, the one or more vehicle data logs descriptive of vehicle conditions associated with one or more autonomous vehicles during the one or more autonomous driving sessions in which the one or more passengers provided the feedback as input data, the at least one vehicle data log comprising one or more operating parameters of an autonomous vehicle performing a vehicle action associated with the passenger input data indicative of the one or more passenger experiences or data indicative of one or more conditions associated with an environment of the autonomous vehicle while the autonomous vehicle performed the vehicle action; and
instructions that, when executed by the one or more processors, cause the computing system to:
associate the at least one set of passenger input data descriptive of the one or more experiences of the one or more passengers and the at least one associated vehicle data log with at least one identified operating parameter or identified condition associated with the environment of the autonomous vehicle; and
train a machine-learned model to perform a vehicle parameter adjustment based at least in part on the at least one identified operating parameter or identified condition associated with the environment of the autonomous vehicle.

16. The computing system of claim 15, wherein the at least one set of passenger input data descriptive of the one or more experiences of the one or more passengers associated with the one or more autonomous driving sessions comprises one or more adjusted vehicle parameter labels associated with the passenger input data and associated vehicle data logs, the one or more adjusted vehicle parameter labels provided by a human reviewer of the passenger input data and associated vehicle data logs.

17. The computing system of claim 15, wherein the one or more operating parameters comprise one or more of: a vehicle speed, a vehicle acceleration, a vehicle deceleration, a lateral acceleration, a vehicle location, a vehicle stop duration, a proximity to a pick-up location, a proximity to a drop-off location, or a passenger comfort setting.

18. The computing system of claim 15, wherein the one or more conditions associated with the environment of the autonomous vehicle comprise one or more of: a vehicle traffic condition, a vehicle behavior, a pedestrian behavior, or an object proximate to the autonomous vehicle.

19. The computing system of claim 15, wherein the adjusted vehicle parameter comprises adjusted cost data utilized for planning a motion of the autonomous vehicle.

20. One or more non-transitory computer-readable media that collectively store instructions that, when executed by one or more processors, cause a computing system to perform operations, the operations comprising:
obtaining passenger input data descriptive of one or more passenger experiences of one or more passengers comprising data indicative of a positive or negative experience for one or more of a pick-up event, a drop-off event, or an in-ride event associated with one or more autonomous driving sessions, the passenger input data comprising feedback provided by the one or more passengers;

obtaining one or more vehicle data logs descriptive of vehicle conditions associated with the passenger input data descriptive of the one or more experiences of the one or more passengers, the one or more vehicle data logs descriptive of vehicle conditions associated with one or more autonomous vehicles during the one or more autonomous driving sessions in which the one or more passengers provided the feedback as passenger input data, the one or more vehicle data logs comprising one or more operating parameters of an autonomous vehicle performing a vehicle action associated with the passenger input data indicative of one or more passenger experiences and data indicative of one or more conditions associated with an environment of the autonomous vehicle while the autonomous vehicle performed the vehicle action;

inputting the passenger input data descriptive of the one or more experiences of the one or more passenger and the associated one or more vehicle data logs descriptive of vehicle conditions into a machine-learned model;

receiving data indicative of an adjusted vehicle parameter as an output of the machine-learned model; and implementing the adjusted vehicle parameter in the operation of an autonomous vehicle.

* * * * *